United States Patent
Groendal

(10) Patent No.: US 8,991,848 B2
(45) Date of Patent: Mar. 31, 2015

(54) BICYCLE FRAME

(75) Inventor: Mark L. Groendal, Wyoming, MI (US)

(73) Assignee: Alter Cycles, Ltd., Wyoming, MI (US)

( * ) Notice: Subject to any disclaimer, the term of this patent is extended or adjusted under 35 U.S.C. 154(b) by 252 days.

(21) Appl. No.: 13/380,726

(22) PCT Filed: Jun. 28, 2010

(86) PCT No.: PCT/US2010/040259
§ 371 (c)(1),
(2), (4) Date: Dec. 23, 2011

(87) PCT Pub. No.: WO2010/151897
PCT Pub. Date: Dec. 29, 2010

(65) Prior Publication Data
US 2012/0098233 A1    Apr. 26, 2012

Related U.S. Application Data

(60) Provisional application No. 61/220,854, filed on Jun. 26, 2009.

(51) Int. Cl.
*B62K 3/02* (2006.01)
*B62K 19/00* (2006.01)
(Continued)

(52) U.S. Cl.
CPC . *B62K 19/06* (2013.01); *B62K 3/04* (2013.01); *B62K 19/24* (2013.01); *B62K 2025/041* (2013.01)
USPC ......... 280/275; 280/274; 280/281.1; 280/283

(58) Field of Classification Search
USPC ........... 280/274, 275, 281.1, 283, 288.3, 278, 280/282, 287
See application file for complete search history.

(56) References Cited

U.S. PATENT DOCUMENTS

| 464,324 | A | * | 12/1891 | Fernald | 280/283 |
| 579,042 | A | * | 3/1897 | Clark | 280/283 |

(Continued)

FOREIGN PATENT DOCUMENTS

| EP | 0222733 | 5/1987 |
| EP | 0669247 | 8/1995 |

(Continued)

OTHER PUBLICATIONS

Response Letter to European Patent Office regarding European Patent Application No. 10792801.2 submitted May 2, 2013 on behalf of Mark L. Groendal.

*Primary Examiner* — Joseph Rocca
*Assistant Examiner* — Marc A Scharich
(74) *Attorney, Agent, or Firm* — Waters & Oppenhuizen PLC; John A. Waters

(57) ABSTRACT

In accordance with the present invention, an improved bicycle frame according to one embodiment of this invention has a top tube that allows the wheel base to lengthen by resiliently flexing or pivotally deflecting vertically while resisting torsional flex This feature is combined with a resilient, flexible, arcuate down tube extending between the bottom bracket of the bicycle and the bicycle head tube or the intermediate connection points The down tube has at least one arc and springs back to its original position from forces of tension as well as compression The combination of the two flexing members gives the bicycle a smoother ride and may also enhance the delivery of pedal" power to the rear wheel The down tube is replaceable in order to modify the flex characteristics of the frame and physical characteristics, such as head tube and seat tube angle, wheel base, and bottom bracket height.

24 Claims, 22 Drawing Sheets

(51) Int. Cl.

| | | |
|---|---|---|
| *B62K 19/02* | (2006.01) | |
| *B62K 19/18* | (2006.01) | |
| *B62K 19/06* | (2006.01) | |
| *B62K 3/04* | (2006.01) | |
| *B62K 19/24* | (2006.01) | |
| *B62K 25/04* | (2006.01) | |

(56) References Cited

U.S. PATENT DOCUMENTS

| | | | | |
|---|---|---|---|---|
| 699,376 | A * | 5/1902 | Errick | 280/283 |
| 701,967 | A * | 6/1902 | Titus | 280/283 |
| 3,966,230 | A * | 6/1976 | Nicol | 280/281.1 |
| 4,669,747 | A * | 6/1987 | Groendal | 280/283 |
| 4,669,787 | A | 6/1987 | Hempelmann | |
| 4,838,569 | A * | 6/1989 | Ford | 280/275 |
| 4,842,292 | A * | 6/1989 | Wang | 280/287 |
| 5,149,119 | A * | 9/1992 | Hwang | 280/275 |
| 5,330,219 | A * | 7/1994 | Groendal et al. | 280/275 |
| 5,772,228 | A * | 6/1998 | Owyang | 280/284 |
| 5,833,258 | A | 11/1998 | Maestripieri | |
| 6,659,487 | B1 | 12/2003 | Raco | |
| 7,367,576 | B2 * | 5/2008 | Pan | 280/278 |
| 7,533,895 | B2 * | 5/2009 | Beal | 280/276 |
| 8,308,178 | B2 * | 11/2012 | Hoerdum et al. | 280/278 |
| 2003/0205882 | A1 | 11/2003 | Parkin | |
| 2004/0160036 | A1 | 8/2004 | Perez | |
| 2006/0131091 | A1 | 6/2006 | Lin | |
| 2006/0273543 | A1 | 12/2006 | Jong | |
| 2014/0239611 | A1 * | 8/2014 | Hon et al. | 280/287 |

FOREIGN PATENT DOCUMENTS

| | | |
|---|---|---|
| FR | 356881 | 12/1905 |
| FR | 450771 | 3/1913 |
| FR | 450771 | 4/1913 |

* cited by examiner

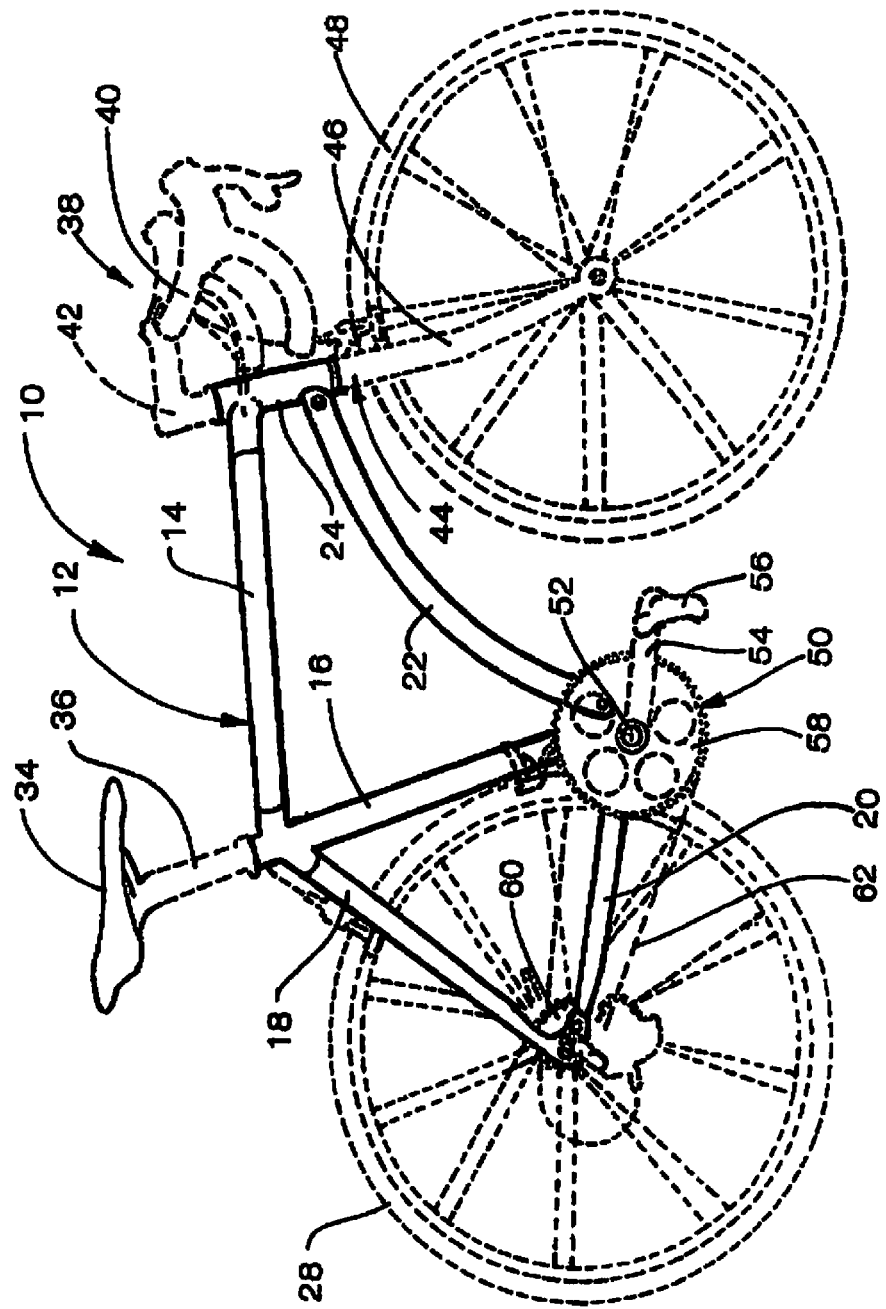

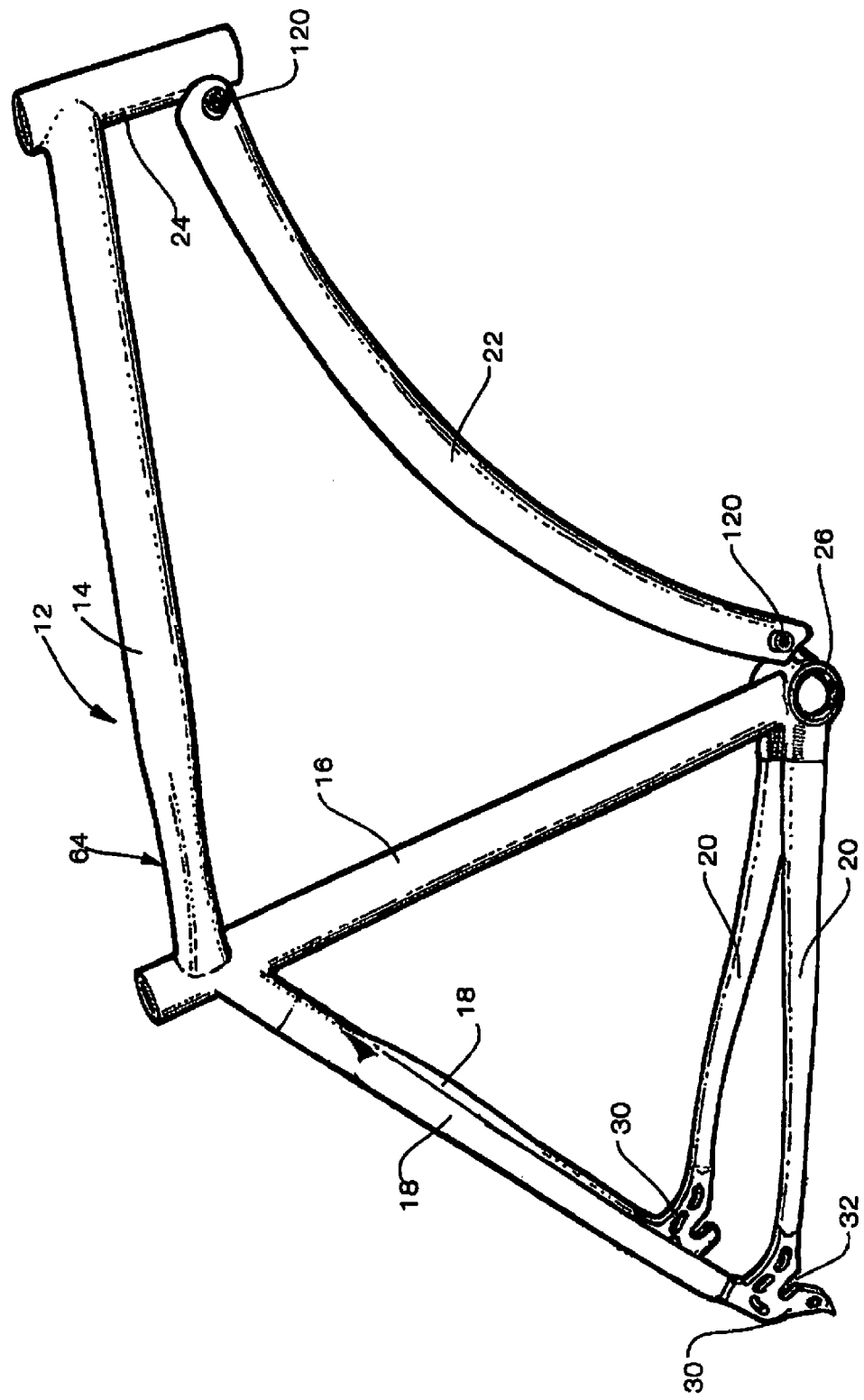

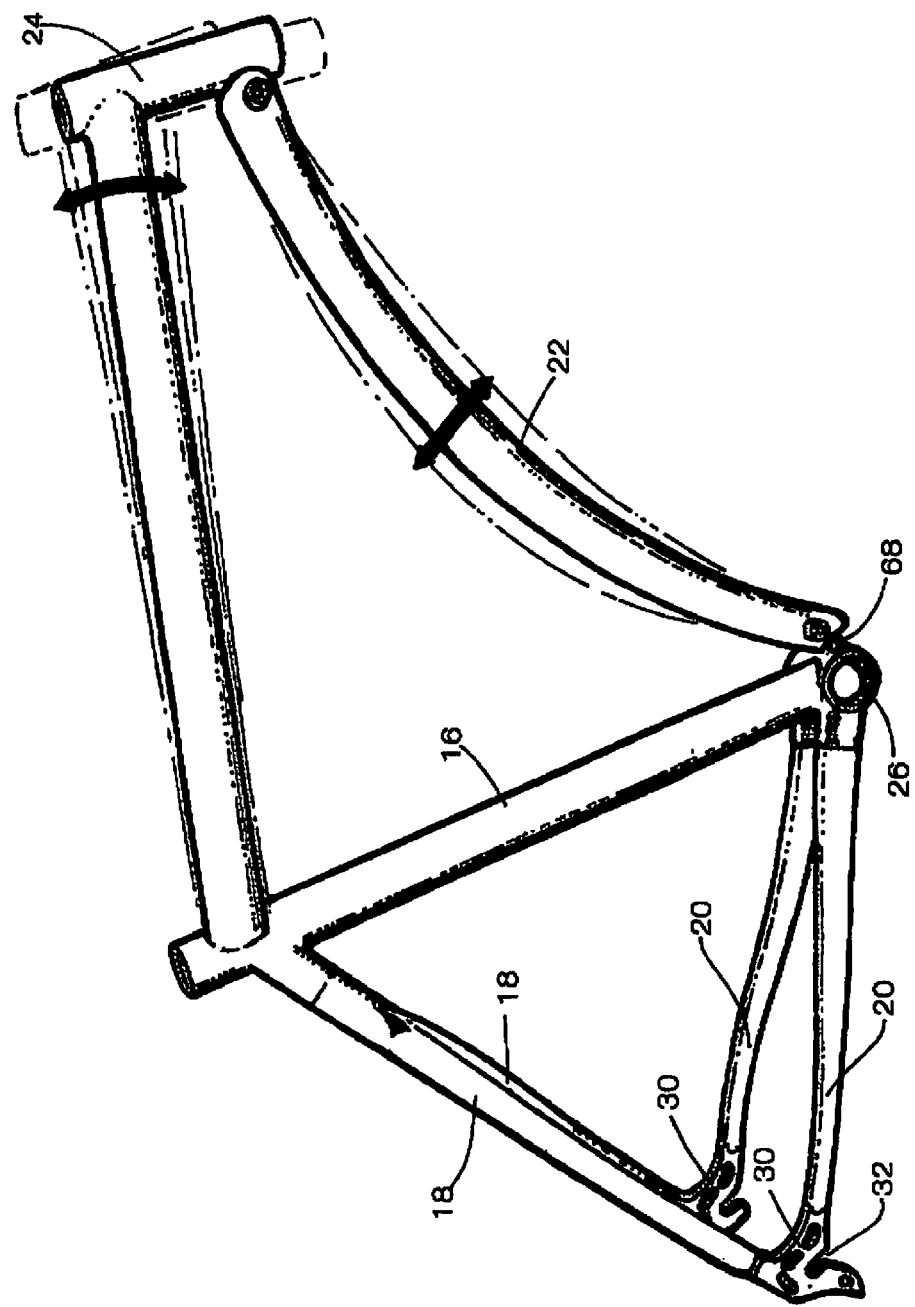

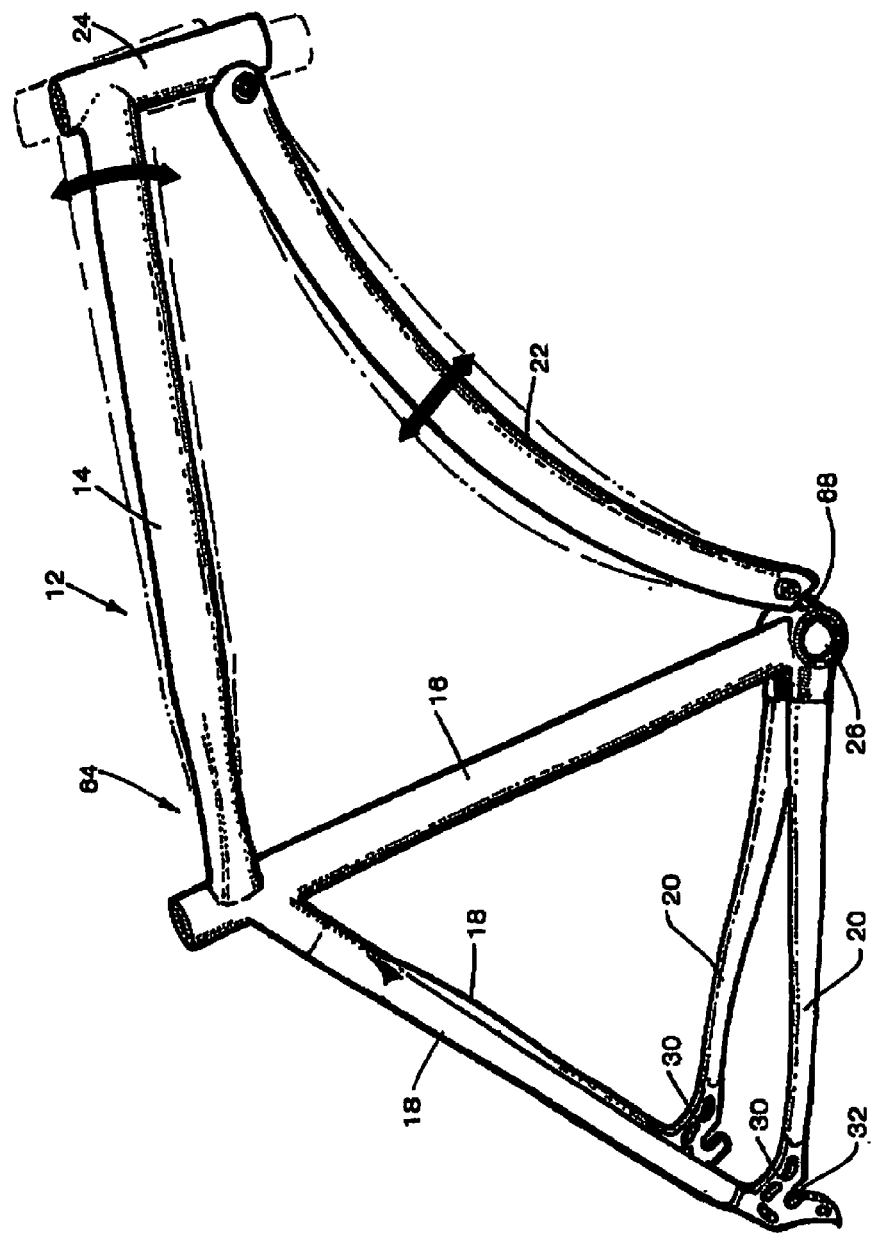

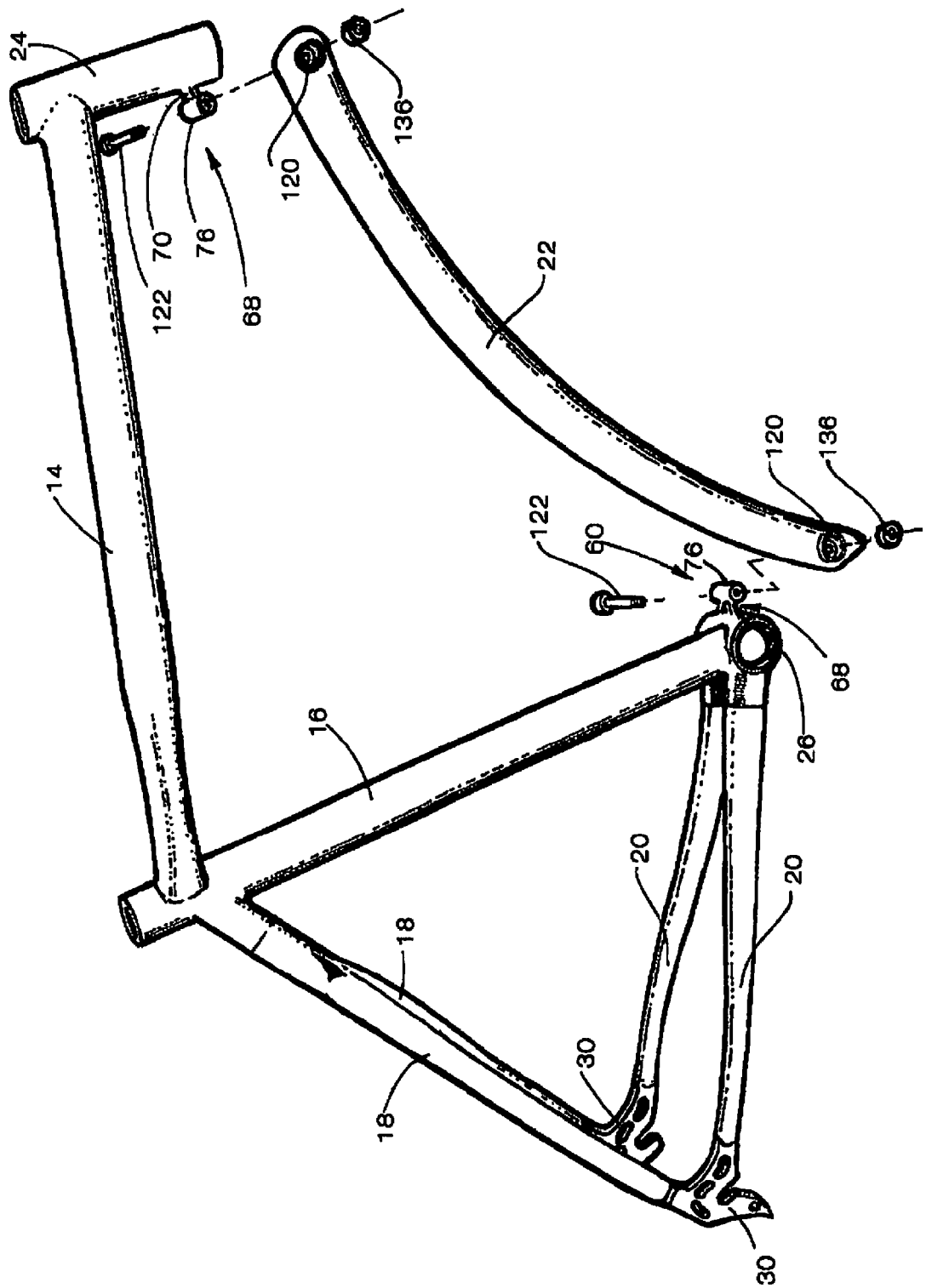

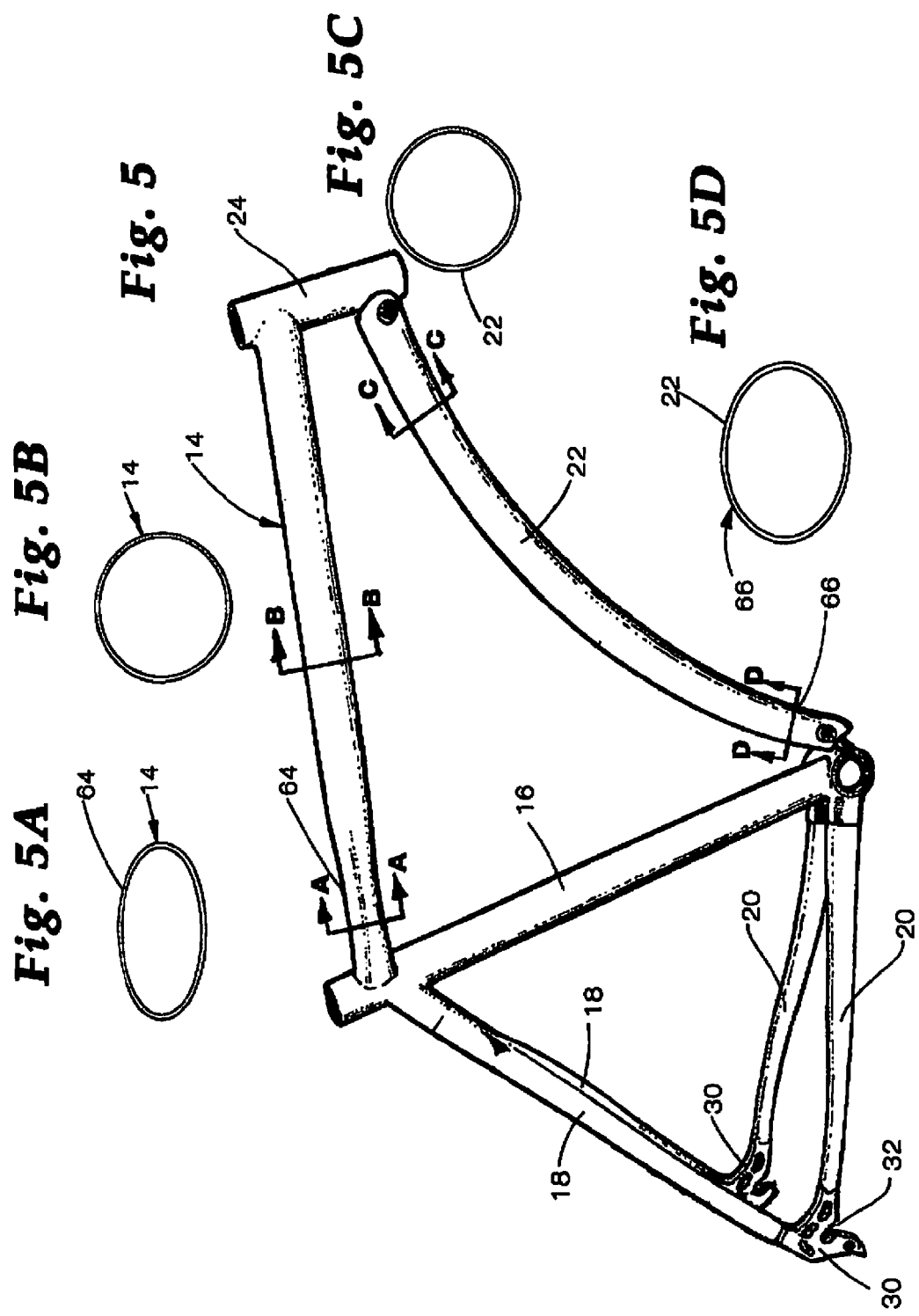

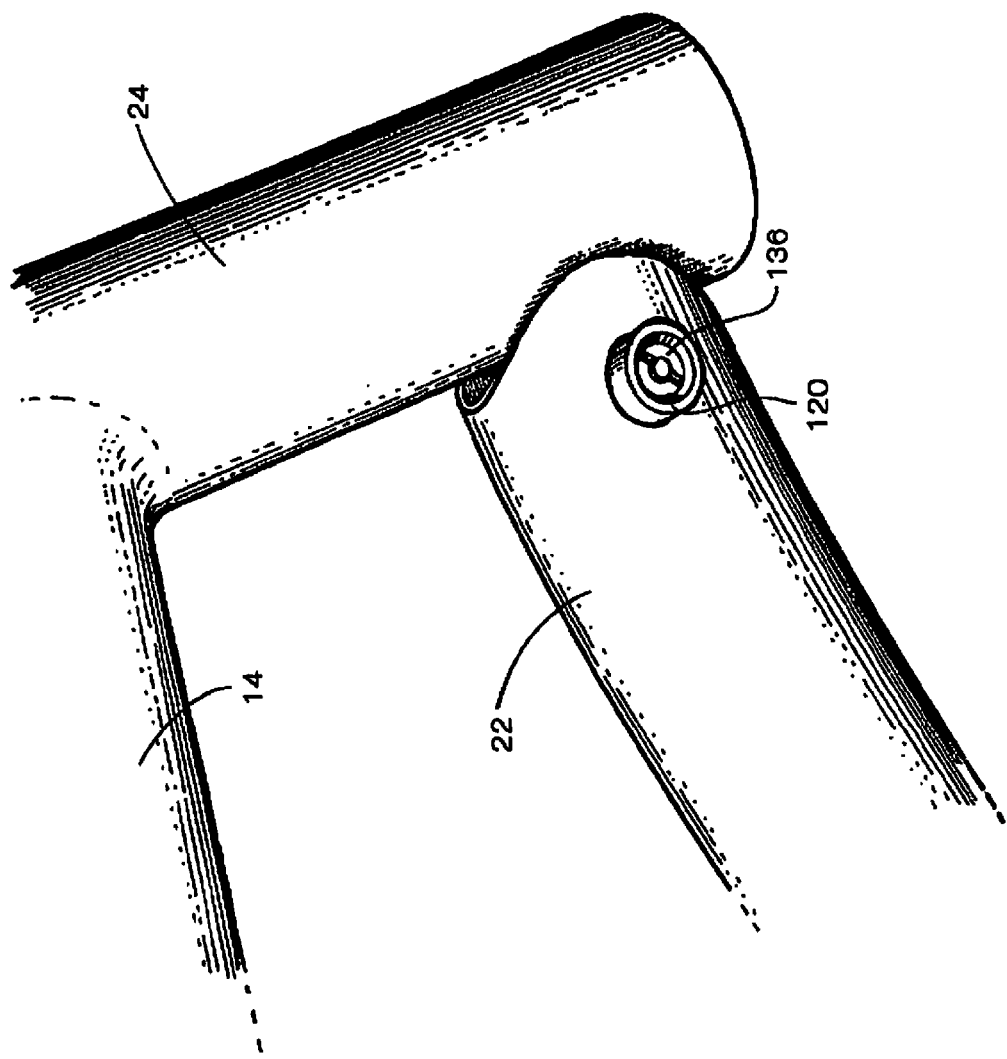

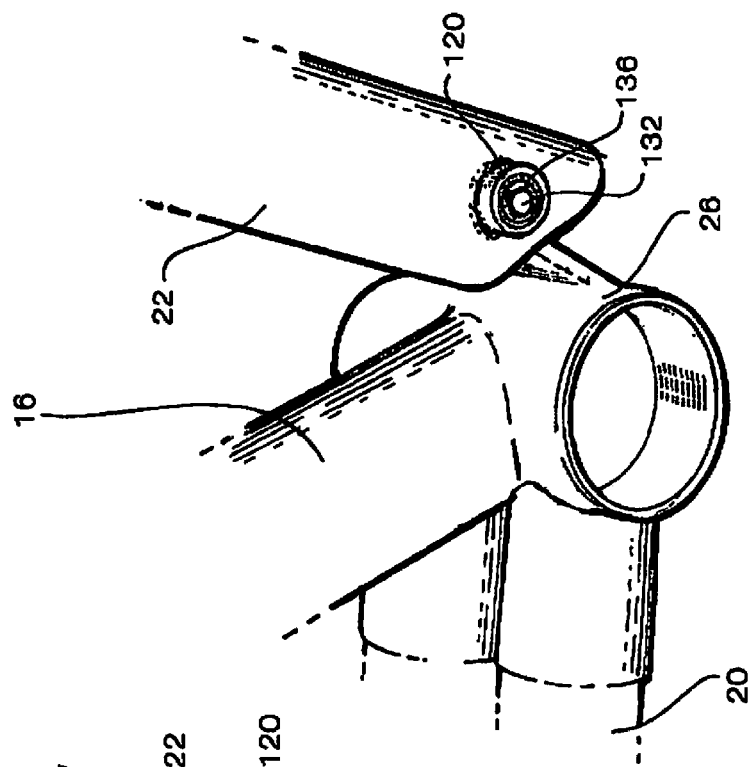
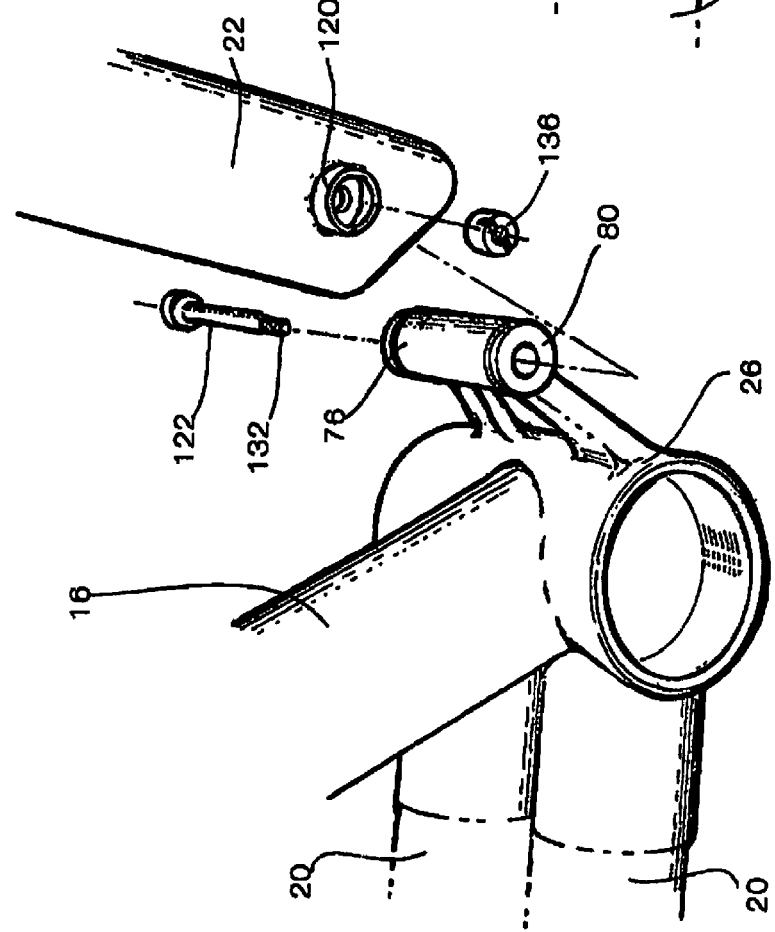

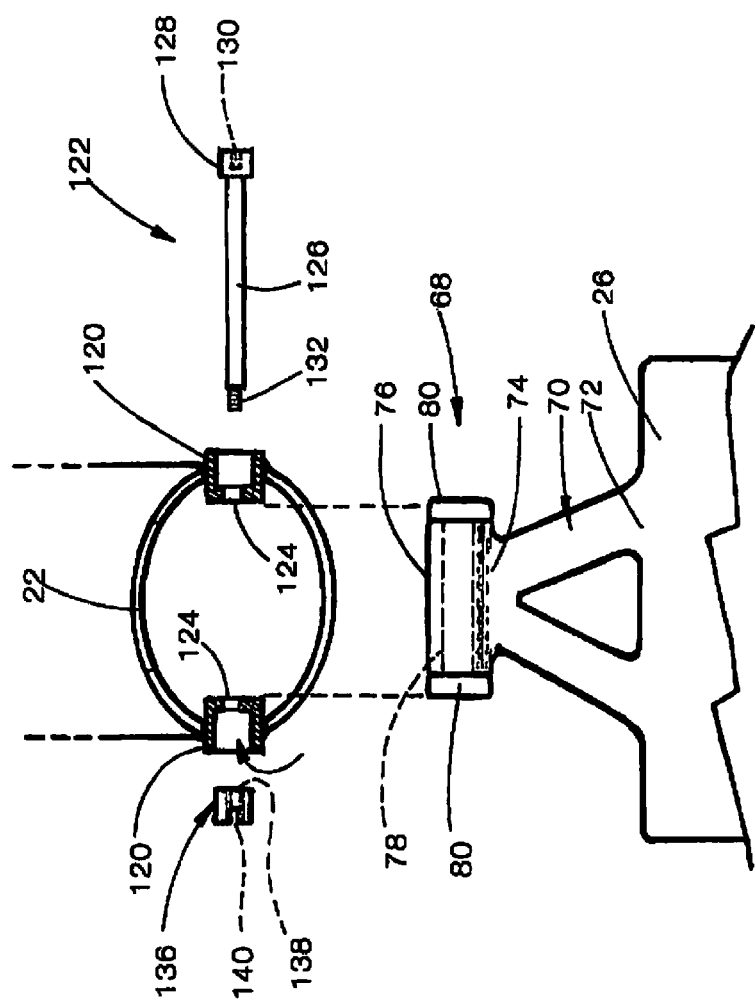

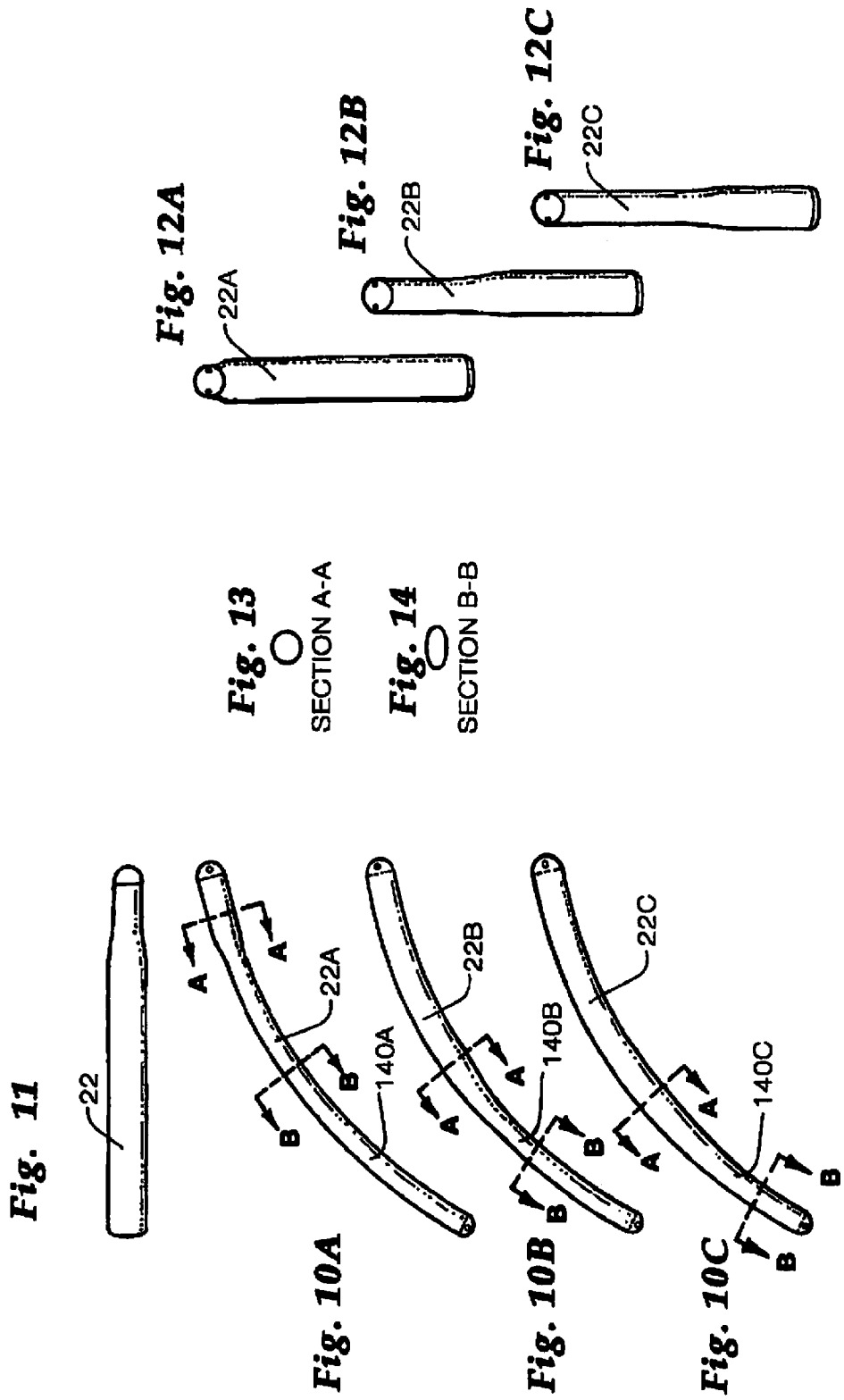

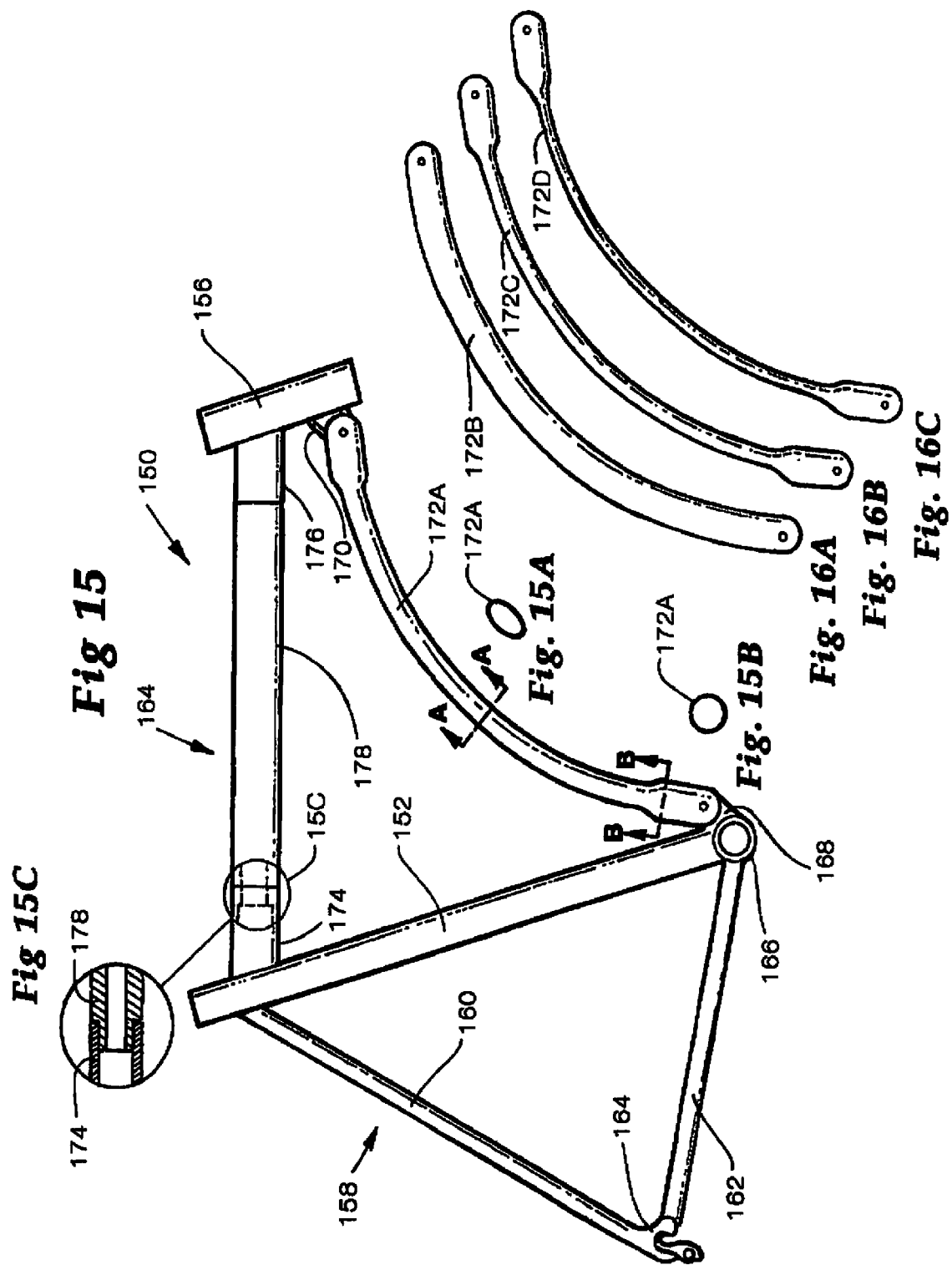

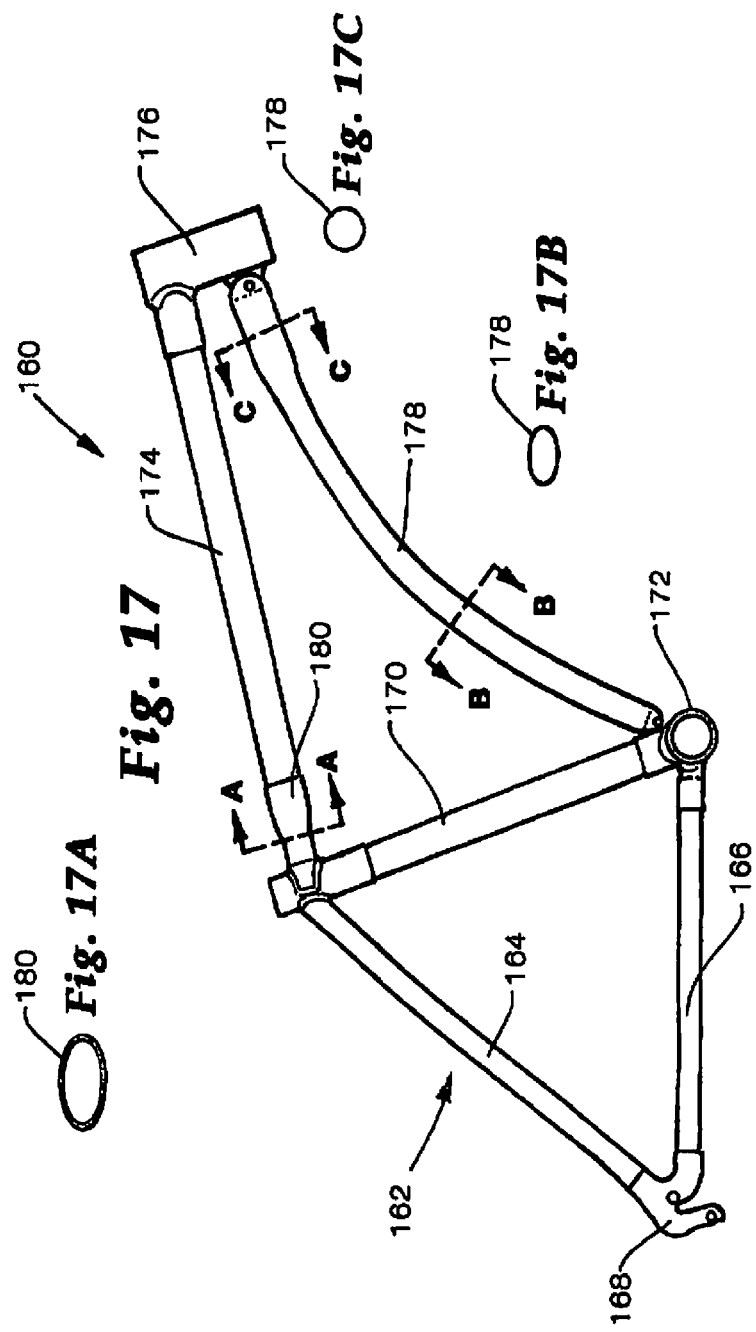

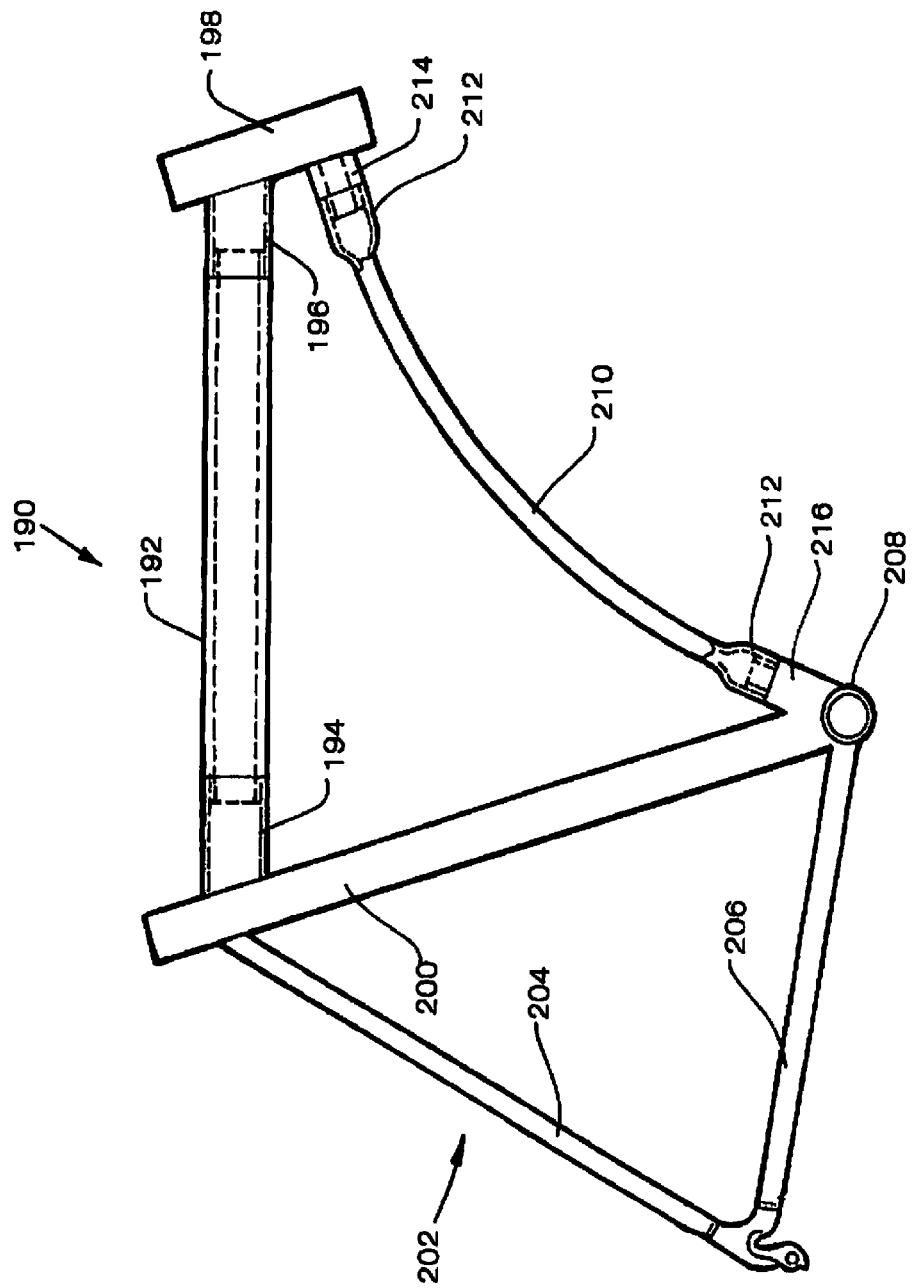

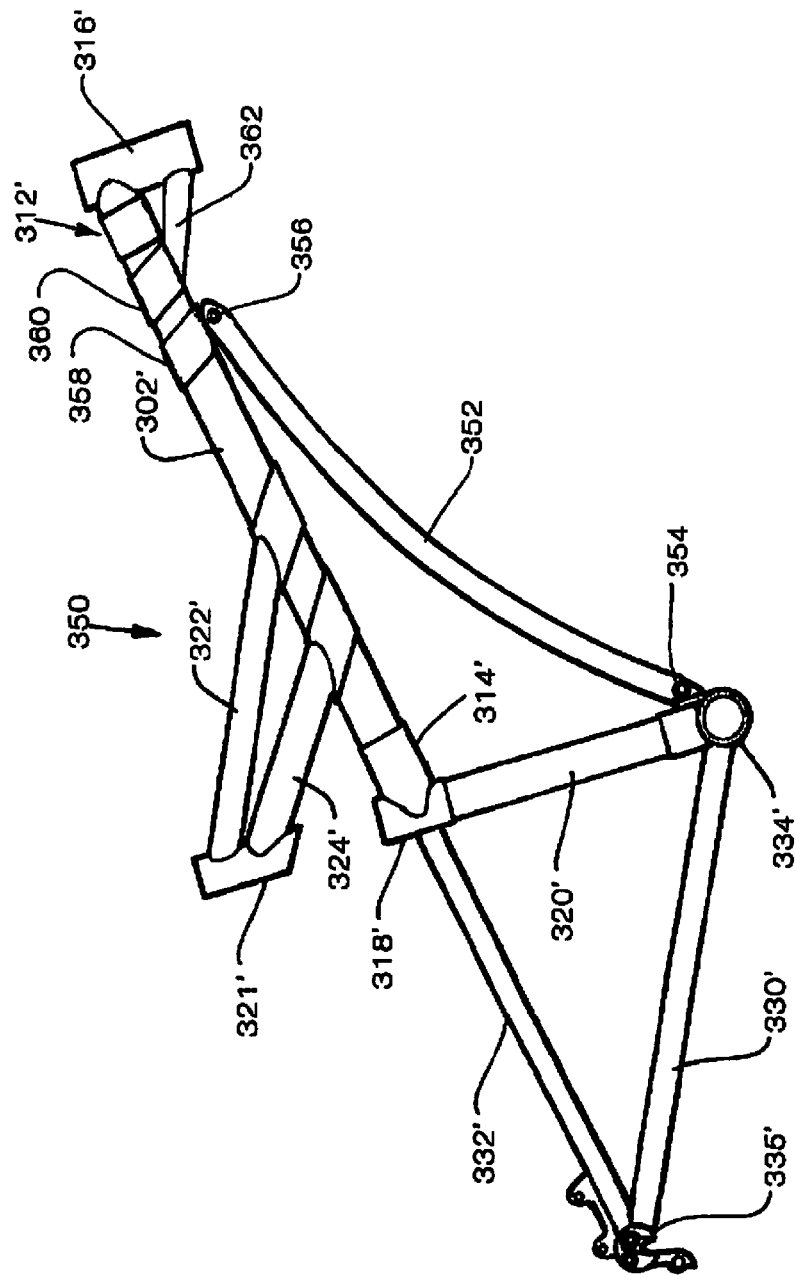

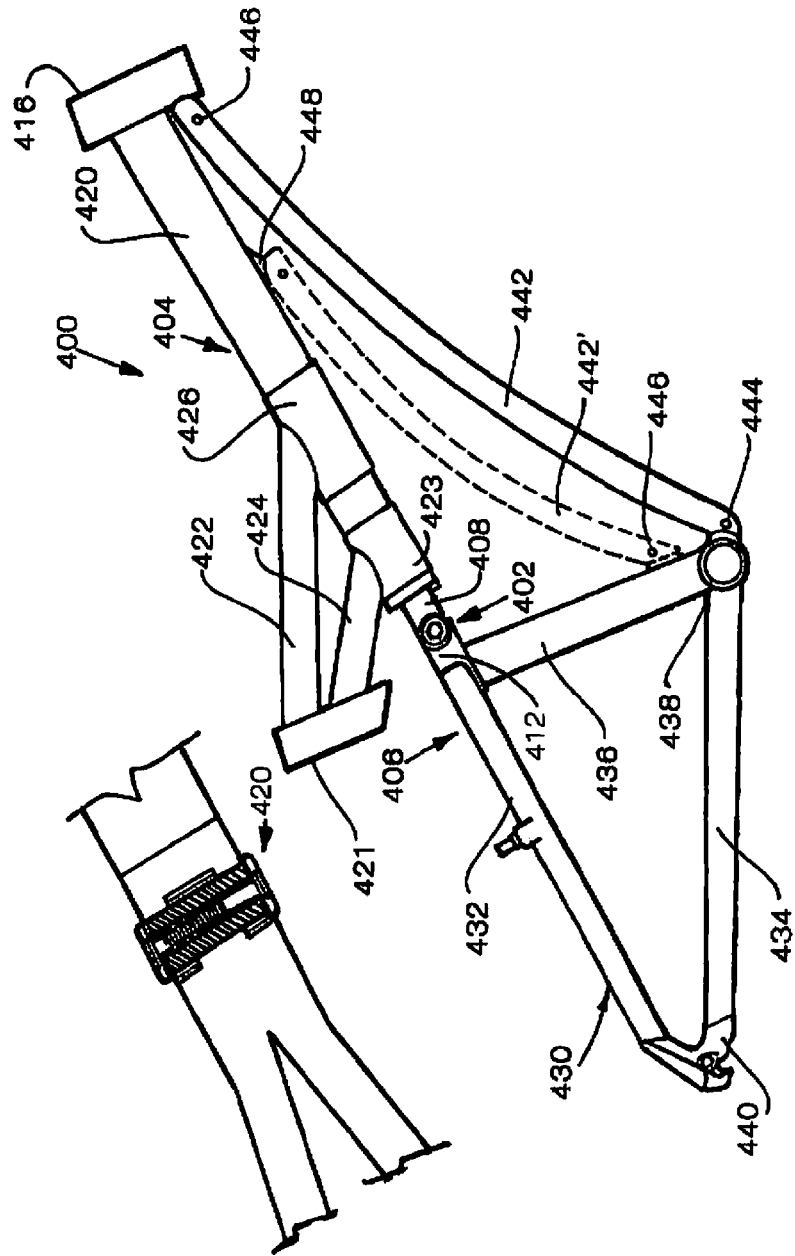

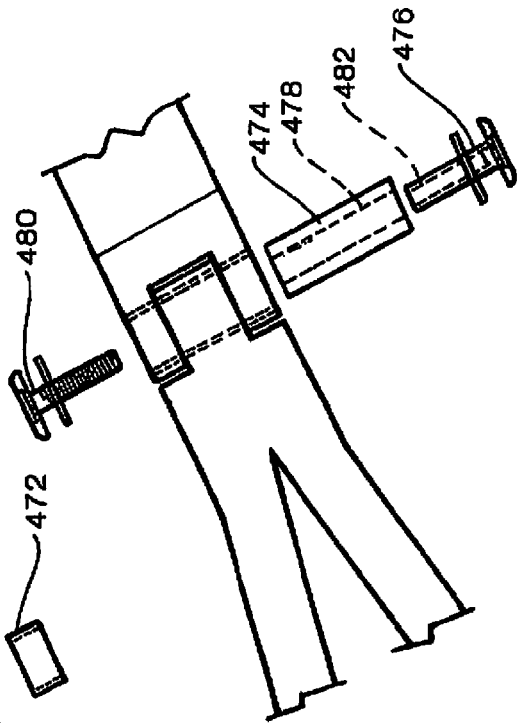
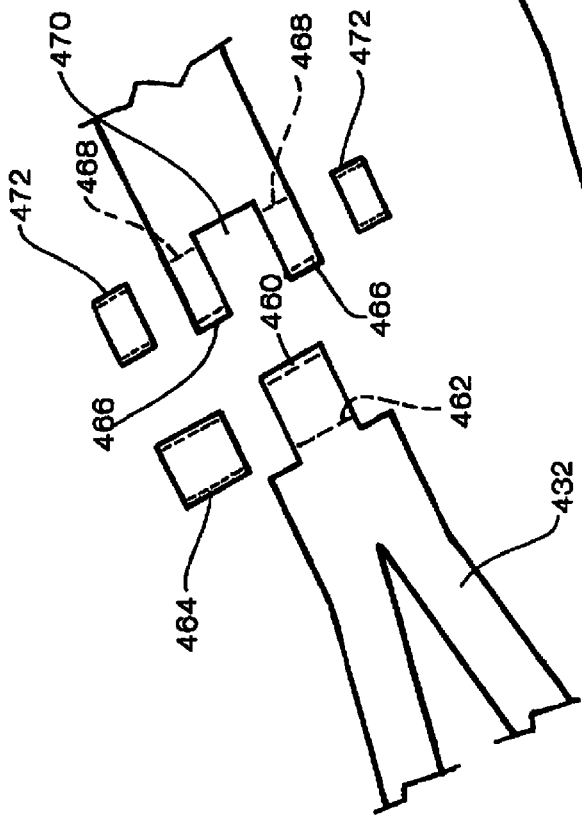

BICYCLE FRAME

CROSS-REFERENCE TO RELATED APPLICATIONS

This application is a nationalization under 35 U.S.C. 371 of International Application No. PCT/US2010/040259, filed Jun. 28, 2010, which claims the filing priority of U.S. Provisional Application No. 61/220,854, filed Jun. 26, 2009, the disclosures of which are incorporated herein by reference, in their entireties, for all purposes.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO A SEQUENCE LISTING

Not Applicable.

BACKGROUND OF THE INVENTION

The present invention relates to bicycle frames and more particularly to a bicycle frame that maximizes energy efficiency and provides a smooth ride by incorporating improved vertical flexibility and increased lateral stiffness in the structure of the frame.

Conventional bike frames are substantially rigid, making them uncomfortable to ride under some circumstances, particularly over rough terrain. To overcome this problem, a number of bikes have incorporated springs and shock absorbers in the frame structure. Springs and shock absorbers increase vertical cushioning in the frame but they add extra components, complexity, and weight to the frame structure and tend to decrease the responsiveness of the frame. In particular, they tend to decrease the lateral or torsional rigidity of the frame, which is undesirable.

A number of bikes have been developed wherein flexibility has been incorporated into the frame itself. In a bike frame previously developed by the present inventor, a steel cable replaces the conventional down tube in the bike frame, and a leaf-type spring is incorporated in the top tube of the frame. The cable is connected to a coil spring that effectively permits elongation of the cable. Other bike frames have incorporated flexibility by other means, including the incorporation of leaf springs in the frame at different locations.

A problem with some prior frames is that the incorporation of too much flexibility in the frame can cause the frame to absorb and dissipate pedaling energy input and produce energy loss. Thus, it sometimes takes more energy to pedal a bike that incorporates energy absorption characteristics than it does to pedal a bike having a more rigid frame. Also, when resilience is desired, different amounts of resilience are desired for different types of bicycles and different types and sizes of riders. Bicycles usually are not adjustable to accommodate these differences.

Where the energy efficiency of a bike frame is of principal importance (such as a road bike), conventional thinking has been that efficiency is maximized by maximizing frame stiffness. In the present invention, this has been found not to be the case. The vertically flexible frame of the present invention appears to increase energy efficiency as well as improve the smoothness of the ride. A too stiff frame produces a harsh ride.

An object of the present invention is to provide an improved bike frame that has sufficient vertical flex to provide a smooth ride and absorb shocks and yet limits lateral or torsional flex and maximizes energy responsiveness of the frame. Another object of the present invention is to provide a bicycle frame wherein the resilience and riding characteristics can be adjusted or modified for different riders and different riding conditions by the use of different interchangeable frame components.

These and other features and advantages of the present invention will hereinafter appear and for purposes of illustration but not of limitation a preferred embodiment of the invention is described and shown in the appended drawings.

SUMMARY OF THE INVENTION

In accordance with the present invention, an improved bicycle frame according to one embodiment of this invention has a top tube that allows the wheel base to lengthen by resiliently flexing or pivotally deflecting vertically while resisting torsional flex. This feature is combined with a resilient, flexible, arcuate down tube extending between the bottom bracket of the bicycle and the bicycle head tube or the intermediate connection points. The down tube has at least one arc and springs back to its original position from forces of tension as well as compression. The combination of the two flexing members gives the bicycle a smoother ride and may also enhance the delivery of pedal power to the rear wheel. In another aspect of the invention, the down tube is replaceable in order to modify the flex characteristics of the frame as well as physical characteristics, such as head tube and seat tube angle, wheel base, and bottom bracket height. Both the flex characteristics and the length of the down tube can be varied in order to modify the riding characteristics of the bike. In one aspect of the invention, the flex point of the top tube is positioned behind the seat pillar in order to provide a flexible cushioning between the seat and the rear wheel of the bicycle. The invention can be incorporated in a frame wherein the frame members are connected by any conventional means, including a lugged, bonded or welded frame or the frame can simply be a one piece monocoque construction. The top tube and down tube can be fabricated of a number of materials, including carbon fiber and titanium or steel. Carbon fiber is preferred for the top tube. Titanium is preferred for the down tube but other flexible materials may work well. In another aspect of the invention, the top tube can be formed of a more rigid material, such as aluminum and wheelbase lengthening and vertical frame deflection can be provided by a hinged top tube and a resilient down tube.

These and other features of the present invention are described in detail below and shown in the appended drawings.

BRIEF DESCRIPTION OF THE SEVERAL VIEWS OF THE DRAWING

FIG. 1 is a side elevational view of a bicycle employing the flexible bicycle frame of the present invention;

FIG. 2C is a perspective view of a third embodiment of the flexible bicycle frame of the present invention employing an ovalized top tube.

FIG. 3A is a perspective view as in FIG. 2A showing the manner in which the frame of FIG. 2A or 2B flexes to provide a cushioned ride; this FIG shows how vertical flex of the top tube is throughout the length of the tube and not concentrated at a smaller portion as in FIG. 3B.

FIG. 3B is a perspective view as in FIG. 2C showing the manner in which the frame of FIG. 2C flexes to provide a cushioned ride;

FIG. 4 is an exploded perspective view of the frame of FIG. 2C, showing the down tube in unassembled position.

FIG. 5 is a perspective view similar to FIG. 2C, showing cross sections of the frame at various positions, identified as FIGS. 5A, 5B, 5C, and 5D.

FIG. 6 is a fragmentary perspective view showing the connection between the upper end of the down tube and the head tube of the frame.

FIGS. 7A and 7B are fragmentary perspective views showing the connection between the lower end of the down tube and the lower end of the seat tube or the bottom bracket shell, with FIG. 7A showing an exploded view of the components prior to connection and with 7B showing the down tube connected to the bottom bracket 12 at the bottom of the seat tube.

FIG. 8 is a fragmentary exploded perspective view showing the down tube connection shown in FIG. 7A.

FIGS. 10A-10C are side elevational views of three alternative down tubes having different spring characteristics.

FIG. 11 is a top view of the down tube of FIG. 10A.

FIGS. 12A-12C are right side elevational views of the down tubes of FIGS. 10A-10C.

FIG. 13 is a cross sectional view of the down tubes of FIGS. 10A-10C taken along lines A-A of each figure.

FIG. 14 is a cross sectional view of the down tubes of FIGS. 10A-10C taken along lines B-B of each figure.

FIG. 15 is a side elevational view of a carbon fiber frame incorporating the resilient down tube spring mechanism of the present invention.

FIGS. 15A and 15B are cross sectional views taken along lines A-A and B-B respectively of FIG. 15. FIG. 15C is an enlarged sectional view of joint 15C between top tube 178 and lug 174 in FIG. 15.

FIGS. 16A-16C are side elevational views of alternative down tubes employed in connection with the frame of FIG. 15, with the alternative down tubes having different spring characteristics.

FIG. 17 is a side elevational view of a carbon fiber frame employing a resilient down tube as in FIG. 15, with the frame also including a vertically deflectable spring member adjacent the seat tube at the rear end of the top tube.

FIGS. 17A-17C are cross sectional views taken along lines A-A, B-B, and C-C respectively of FIG. 17.

FIG. 18 is a side elevational view of an alternative embodiment of the present invention employing a carbon fiber frame and a down tube that is bonded to the frame.

FIG. 21 is a side elevational view of an embodiment similar to FIG. 2 employing a shorter down tube connected to the top tube at a position spaced away from the head tube.

FIG. 22 is a side elevational view of another embodiment of the present invention employing a hinged top tube instead of a resilient top tube and disclosing alternative lengths and mounting positions of the down tube.

FIG. 23 is a fragmentary top view showing the hinge assembly of FIG. 22.

FIG. 24 is a partial exploded top view of the hinge assembly of FIG. 23.

FIG. 25 is a view similar to FIG. 24 showing the assembly of the hinge mechanism.

DETAILED DESCRIPTION OF THE INVENTION

Figure 2A:
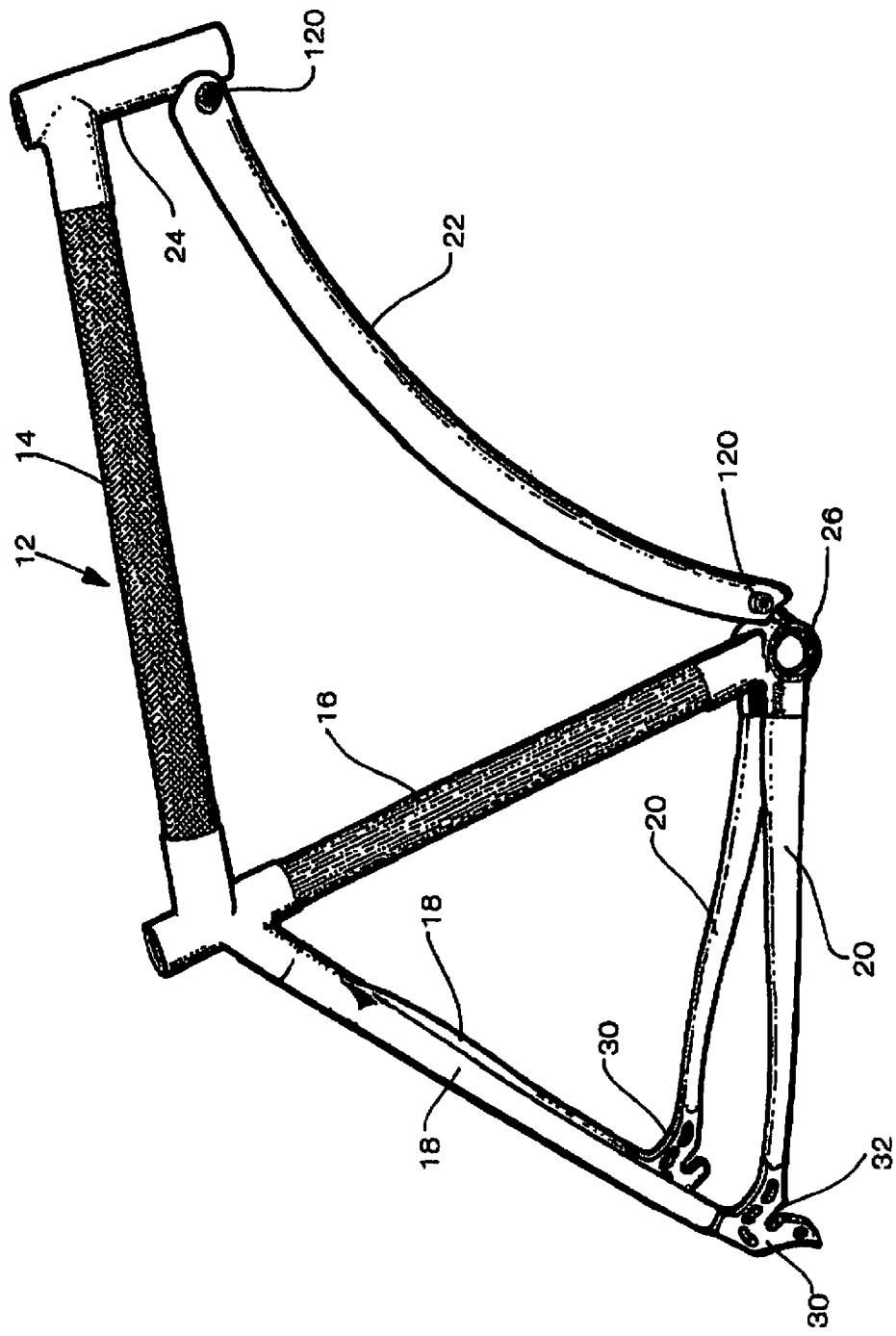
FIG. 2A is a perspective view of a first embodiment of the flexible bicycle frame of the present invention employing a carbon fiber top tube.

Referring to the drawings, a first embodiment of bicycle 10 employing a flexible frame 12 in accordance with the present invention is shown in FIG. 1. Bicycle 10 is illustrated as a road bike. However, the invention could be used for off road bikes, mountain bikes, BMX bikes, cycle cross (cyclocross) bikes, trail bikes, time trial bikes, city bikes, casual use bikes, and other styles of bike.

Bike frame 12 shown in FIG. 1 comprises a top tube 14, a seat tube 16, a seat stay 18, a chain stay 20, a down tube 22, a head tube 24, and a bottom bracket shell 26 (shown in FIG. 2). The frame includes two chain stays 20 and two seat stays 18, on opposite sides of rear wheel 28, with rear ends of seat stay 18 and chain stay 20 being connected to a rear drop out 30 that engages the axle on rear wheel 28 in an upwardly extending slot 32. Seat stay and chain stay members 18 and 20 may be formed of metal or carbon fiber material or other conventional materials. A seat 34 mounted on a seat post 36 is mounted to the upper end of seat tube 16, with seat post 36 fitting downwardly inside the hollow upper end of seat tube 16.

A handlebar assembly 38, comprising handlebar 40 and stem 42, mounts on the upper end of head tube 24, with stem 42 being rotatably mounted on bearings in an open upper end of head tube 24. A fork assembly 44 comprises a pair of spaced forks 46 on each side of front wheel 48, with a conventional fork steerer tube (not shown) extending upwardly into the interior of head tube 24, where it operably engages with the stem on the handlebar.

The bicycle is powered by a conventional pedal mechanism attached to the bottom bracket shell 26 at the bottom of the seat tube 16. A bottom bracket spindle 52 mounted on bearings inside the bottom bracket shell 26 extends outwardly from the sides of the bottom bracket shell and engages conventional crank set comprising crank arms 54 mounted at one end on the bottom bracket spindle and having pedals 56 mounted on the outer end. A chain ring or sprocket 58 is mounted on the spindle for rotation with the pedals. A rear sprocket 60 drivingly engaged to rear wheel 28 is driven by a chain 62 by chain ring or front sprocket 58 in a conventional manner.

Figure 2B:
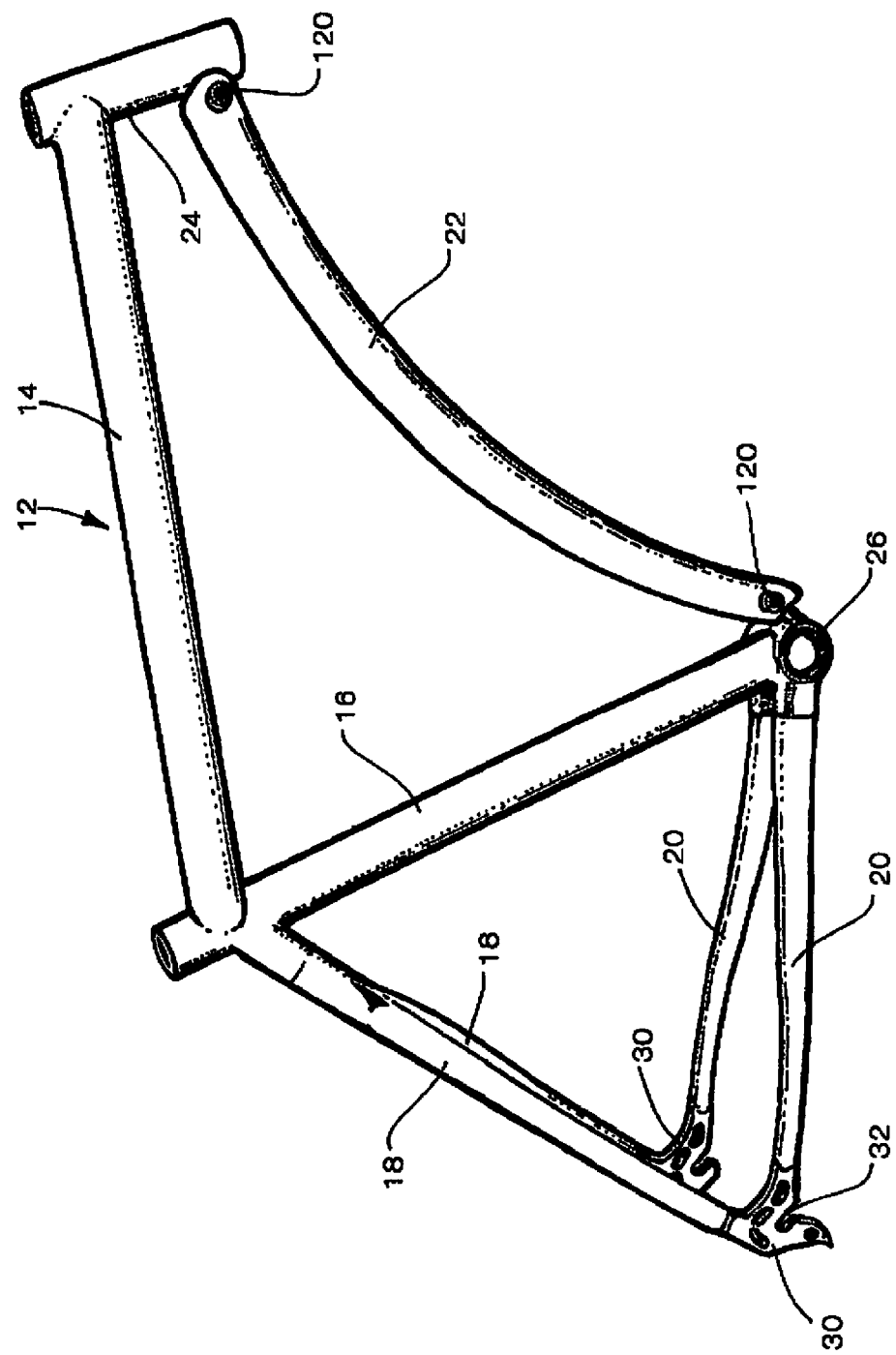
FIG. 2B is a perspective view of a second embodiment of the flexible bicycle frame of the present invention employing a carbon fiber top tube.

The construction of three embodiments of frame 12 is shown in detail in FIGS. 2A-2C. While this frame appears conventional, the frame and particularly the top tube 14 and down tube 22 are carefully constructed to incorporate a predetermined amount of resilient vertical flex while providing increased resistance to lateral or torsional flex. Like parts of the three embodiments employ the same reference numerals.

In the frames of FIGS. 2A-C, seat stays 18, chain stays 20, and fork members 44 can be formed of a relatively rigid material. They can be formed of conventional metal or non-metal frame materials but desirably are formed of a carbon fiber material (a synthetic resin reinforced with carbon fibers). The seat tube can be formed of a tubular metal such as a titanium alloy, but a unidirectional carbon fiber material (to maximize lateral rigidity) is preferred. The principal flexing members of the frame, namely, top tube 14 and down tube 22, are formed of flexible tubes having a spring rate that provides the vertical spring flex characteristics of the frame.

In the preferred embodiment shown in FIG. 2A, top tube 14 desirably is formed out of a round carbon fiber tube, and down tube 22 desirably is a tubular member formed of a conventional titanium alloy (referred to as "titanium") selected for its desirable flex characteristics. Examples of suitable titanium alloys include 3AL-2.5V and 6AL-4V. The titanium down tube can be partially ovalized, with the major diameter being horizontal. Ovalization increases the vertical flexibility of the tube. Titanium has excellent energy conservation characteristics, which means that the amount of energy expended to bend the frame is substantially returned when the frame springs back into its original position. Titanium also provides an excellent spring rate. Other materials may be used to alter the spring rates or to reduce cost.

In the preferred practice of the invention, the top tube 14 and down tube 22 are constructed so that the vertical flex or "travel" of the top and down tubes (the amount of vertical deflection of the front of the tubes at the head tube with respect to the rear ends of the tubes at the seat tube and bottom bracket over the length of the tube) is at least about 1/64 (0.0156) inches and preferably about 1/16 inch to about 1½ inch for a road bike and about 1/16 to about 2 inches or more for an off road bike, the exemplary flex characteristics being measured in response to the test load force of 320 pounds in all test measurements in this application. By comparison, a conventional stiff frame (which might be formed of aluminum, carbon fiber or steel) would typically have a vertical travel of around 0.009 to 0.011 inches. The travel of the frame of the present invention is thus at least about 1½ to 2 and often several times the travel of a stiff or rigid frame. A travel range of about 1/32 to about 3/8 inches or more is desirable for a road bike. The manner in which the frame flexes is shown in FIG. 3. It is important to note that the frame resiliently flexes in both extension and compression modes, not just in the extension mode, as with a cable down tube. This amount of travel, while seemingly small, actually produces a pronounced effect on ride smoothness and energy efficiency.

The spring characteristics of the downtube spring are determined by a number of factors, in addition to the material from which a tube is made. Tube diameter has a substantial effect. Wall thickness has an effect, but less so than the diameter of the tube. In the exemplary embodiments of the present invention employing a titanium alloy, a wall thickness of about 0.035 inches is employed. A thinner or thicker wall can be employed. A wall as thin as about 0.028 inches is feasible. Walls thicker than 0.035 inches would not appear to be necessary and would therefore involve more material and would be more expensive. A wall thickness of up to about 0.045 inches or more would work but would be heavier and more rigid.

In the exemplary embodiments of FIGS. 2B and 2C, titanium tubing used for the top tube has a diameter of about 1½ inches. A larger diameter would make the tube stiffer, whereas a smaller diameter would make the tube more flexible. An operative range of 1-2 inches could be employed, depending upon other characteristics of the tubing and the desired flexibility. The diameter of the tubing should be such that the tubing does not crease or split when the tubing is deflected. Desirably, the tubing should be able to be bent until the tube is deflected into an oval shape without significant plastic deformation of the tube. In the exemplary embodiment of the invention, a tube of 1½ inch diameter tube can be bent into an oval shape having a minor diameter of ¾ inch, while still springing back to a minor diameter of at least 1 to 1⅛ inches when the deflecting force is released.

In the frames of FIGS. 1, 2A, and 2B, the top tubes are round carbon fiber and titanium respectively. The carbon fiber is the preferred construction. In the frame of FIG. 2C, a portion of the titanium top tube is formed into an oval shape or "ovalized." This is portion 64 adjacent the rear end of top tube 14. The oval shape (shown in FIG. 5A) in this embodiment is about one inch across the minor diameter and 1¾ inch across the major diameter. This provides increased vertical flex for the tube. However, this increased flex can make the top tube too whippy for some purposes, so a stiffer, round tube is generally preferred. When an ovalized portion is employed, the ovalized portion is approximately 1 to 3 inches long, and preferably about 2 inches long.

The down tube 22 of FIG. 1 provides flex by virtue of the material used and the fact that it is curved. Desirably, the down tube has an arcuate radius of approximately thirty to forty inches, although a specific arc radius is not critical. The importance of the arcuate shape of the down tube is that the tube can flex in the manner shown in FIGS. 3A and 3B, much like a bow would flex. In the embodiments of FIGS. 2A-2C, down tubes 22 are formed of titanium. As shown in FIGS. 5, 5C, and 5D, down tube 22 also has an area of ovalized shape 66 formed at the lower end of the down tube in FIG. 5. Ovalized portion 66 does not require the same amount of ovalization as portion 64 of the top tube and is less critical to the operation of the frame than the top tube, since much of the bending and movement of the down tube occurs in the middle of the down tube, shown in FIG. 3.

Another feature of the present invention is the manner in which the down tube is attached to the head tube and bottom bracket shell of the frame. The down tube is desirably bolted to the frame at the ends of the down tube in a pivot joint, such that the down tube can rotate around the bolted connection and can be replaced as desired in order to change the flex characteristics and other attributes of the frame for different riders or riding conditions.

Figure 9:
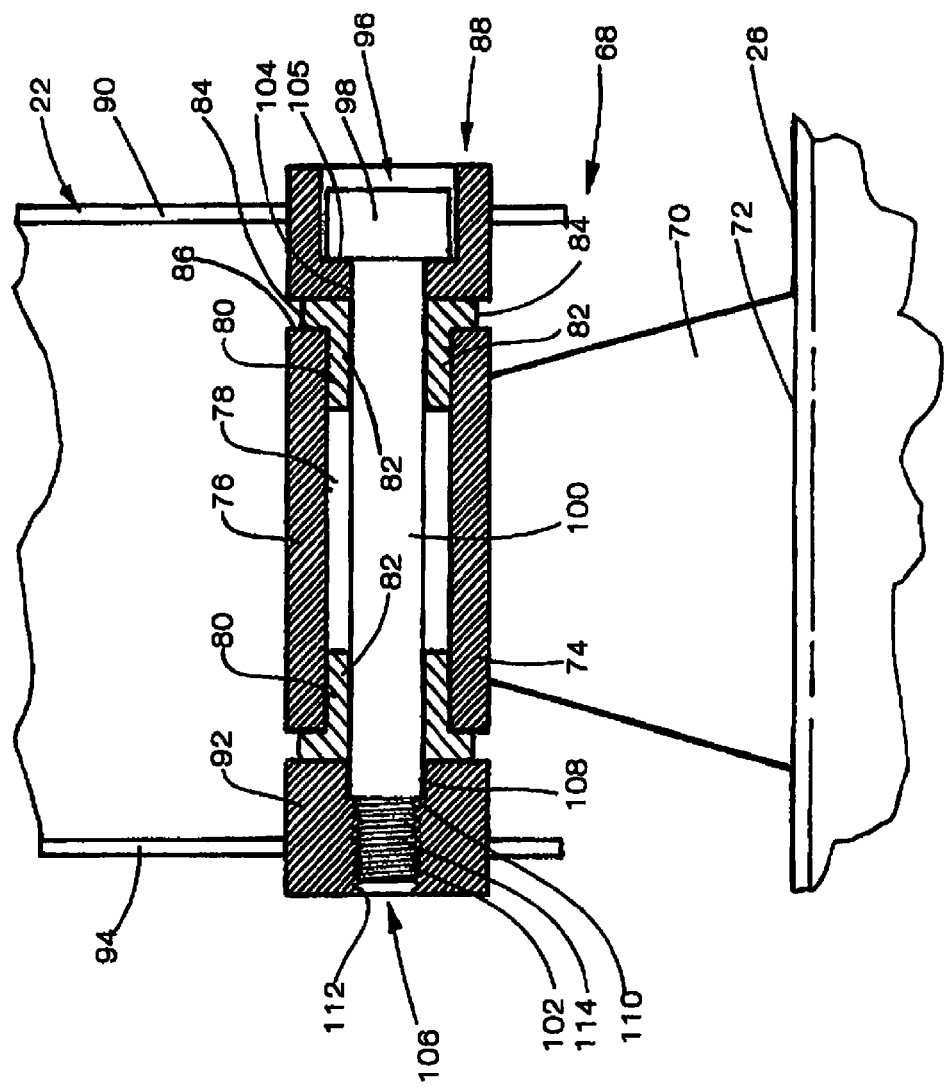
FIG. 9 is a cross-sectional view of an alternative embodiment of the down tube connection shown in FIG. 8.

The manner in which the down tube is attached to the frame is shown in more detail in FIGS. 4 and 6-9. FIGS. 8 and 9 disclose different embodiments of the attachment means. In both embodiments, mounting mechanism 68 comprises a base 70 mounted to the head tube or bottom bracket shell 26 of the frame. For exemplary purposes, the mounting mechanism attached to the bottom bracket shell is illustrated. Base 70 extends outwardly from a lower end 72 to an outer end 74, which is attached to a transverse tubular member 76. Tubular member 76 has an internal opening 78 extending therethrough. Bushings 80 are inserted in opposite ends of the tube. Bushings 80 have an internal tubular portion 82 (see FIG. 9) and an external flange 84 that abuts outer ends 86 of the tube 76. The bushings reduce friction between the various elements.

In the embodiment of FIG. 9, a socket member 88 is securely fastened in an opening in one side 90 of tube 22. A nut 92 is fastened in an opening in an opposite side 94 of tube 22. The nut and socket are welded or otherwise mounted securely in a fixed position in tube 22.

In the mounting mechanism of FIG. 9, a bolt 96 having a head 98, shaft 100, and threaded end 102 on the shaft extends through an opening 104 in an end 105 of socket 88, through the open interior 78 of tube 76, through bushing 80 at the opposite end of tube 78, and into an internal opening 106 in the nut. Opening 106 has an enlarged portion 108 that engages a shoulder 110 on the bolt. A threaded portion 112 of the nut engages a threaded portion 114 on the end of the bolt of somewhat smaller diameter than shoulder 108. The bolt thus can be tightened securely between socket 88 and nut 92 while still permitting rotation of tube 22 with respect to base 70. This mounting mechanism permits tube 22 to rotate about the transverse axis of bolt 96 without unscrewing the bolt.

In the mounting mechanism embodiment of FIG. 8, base 70, tubular member 76, and bushings 80 are substantially the same as in FIG. 9. To the extent that the components of FIG. 8 and FIG. 9 embodiments are the same, the same reference numerals are used.

In FIG. 8, ovalized tube 22 has a pair of socket members 120 welded in openings on opposite sides of ovalized tube 22. Bolt 122 extends through openings 124 in the ends of sockets 120. Bolt 122 has an elongated shaft 126, a head 128 with a recessed hexagonal or other wrench opening 130 in the end thereof. Bolt 122 has a threaded end 132 of reduced diameter relative to shaft 126. Shaft 126 fits through openings 124, so threaded end 132 extends into an open interior 134 in socket 120. A nut 136 having a threaded interior opening 138 on an inner side and having a socket recess 140 on an outer side fits in opening 134. Threaded end 132 on bolt 122 engages and is locked in position in the tube by nut 136. When the bolt is thus tightened in the nut, tube 22 can rotate or pivot about the axis of bolt 122 without unscrewing nut 136 from the bolt. Because of the amount of flex that a bicycle frame encounters, a bolt that resists becoming unscrewed with continuous flex of the bicycle provides a significant advantage.

In operation, when a bicycle employing the bicycle frame of the present invention is pedaled vigorously or engages rough terrain, the front end of the frame can flex upwardly and downwardly with respect to the rear end of the frame in order to store pedaling energy or absorb the bumps. The frame flexes upwardly and downwardly in the manner shown in FIGS. 3A and 3B, with the curved down tube flexing as a leaf spring or bow, with the ends of the down tube rotating about the mounting mechanisms. The down tube strengthens the frame and smoothes the ride and increases pedaling energy efficiency by providing vertical flex, while improving frame efficiency by resisting torsional or lateral flexing.

The top tube, having an ovalized rear portion with the minor diameter extending in a vertical direction and the major diameter extending in a horizontal direction, has desirable vertical flex characteristics especially in the ovalized portion, while providing enhanced lateral stiffness and resistance to torsion. Flexing under lateral stresses and torsion generally results in energy loss, while vertical flex provides a smoother ride and may actually enhance energy response of a bike frame. The bike frame tends to lengthen slightly when a pedal is pressed downwardly with force, and the frame returns to its undeflected position when at the end of a pedal stroke. Thus, the frame acts like a spring, storing energy when the pedal is depressed, and releasing that energy when the pedal stroke is completed. This provides a smoother ride and enhances the delivery of pedal power to the rear wheel.

In operation, the flexible down tube provides an increased range of movement of the frame in a vertical direction in comparison with the range of movement present in a so-called rigid frame. Whereas the top tube of a rigid frame might be expected to deflect slightly, (perhaps up to eleven thousandths of an inch) between the head tube and seat tube of the frame, in the present invention the top tube might be expected to flex vertically between 1/16 and about 1½ inches.

Another feature of the present invention is that the flex characteristics of the down tube may be altered as desired to suit a particular rider or riding condition simply by replacing one down tube with another down tube having different flex characteristics. Typically, the flex characteristics of a titanium down tube are determined by the length of the ovalized portion of the down tube. Referring to FIGS. 10A-14, three different down tubes, 22A, 22B, and 22C are shown in FIGS. 10A-10C. Sections A-A and B-B reflected in FIGS. 13 and 14 show that ovalized portions represented by sections B-B can be of different lengths in different down tubes. Ovalized portion 140A in FIG. 10A is relatively long and occupies a majority of the length of the down tube. This down tube will have the greatest flexibility of the three down tubes shown. Down tube 140B shown in FIG. 10B extends for about one half of the length of the down tube and provides less flex than the down tube of FIG. 10A. Ovalized portion 140C, shown in FIG. 10C occupies the shortest portion of the down tube of the three down tubes shown in FIGS. 10A-10C and provides the stiffest ride. Any number of down tube configurations having different lengths of ovalized portions can be provided in order to provide different riding characteristics. Using different materials such as steel or carbon fiber can also vary these characteristics as well.

As another benefit, the length as well as the flexibility of the down tube can be varied. Changing the length of a down tube changes the angle of the head tube and at the same time the height of the bottom bracket. This in turn changes the angle of the fork and thereby changes the handling characteristics of the bicycle. The ability to vary these characteristics to suit a particular rider or particular riding condition can be is a major benefit to cyclists.

Standard bicycle frames do not have this option. By replacing one arced spring down tube with another of a slightly different length, the effective angle of the head tube and fork are changed. A shorter length will make the bicycle turn "quicker", which is beneficial when quicker steering is desirable. A longer down tube will make a bicycle turn "slower", when slower steering, often at higher speeds, is desirable.

To replace a down tube, the bolts securing the down tube can be removed using conventional hex wrenches or the like and the down tube simply replaced. With the replaceable down tubes, different riders can enjoy desirable riding characteristics on the same bicycle and under different riding conditions.

Another embodiment of the present invention is shown in FIGS. 15-16C. In this embodiment, frame 150 comprises a seat tube 152, a top tube 154, a head tube 156, and a rear triangle 158 comprising seat stays 160 and chain stays 162 connected to a rear dropout 164 that supports the rear wheel (not shown). A bottom bracket shell 166 is mounted at the base of seat tube 152 and the front end of chain stays 162. A support flange 168 extends forwardly and upwardly from bottom bracket shell 166. Support flange 168 is comparable to mounting mechanism 68 of the embodiment of FIG. 1. A support flange 170 extends downwardly and rearwardly from a lower portion of the head tube 156 and includes a transverse opening and bushing extending therethrough as described previously. Any one of a number of arcuate down tubes 172A-D can be employed in the frame. The tubes are ovalized as reflected in section A-A, shown in FIG. 15A. The amount of ovalization can be modified as shown in FIG. 15A-15C.

The construction of the frame of FIG. 15 is somewhat different from a titanium frame. This frame is formed of a carbon fiber material largely. Preferably, the down tubes are still titanium because of the flex characteristics and energy return characteristics of titanium. Carbon fiber or steel down tubes, however, can be used. In frame 150, the rear triangle 158 is formed of carbon fiber, as is the head tube 156. Seat tube 152 is formed of unidirectional carbon fiber tube in order to minimize lateral deflection of the tube. Lug fittings 174 and 176 extend from the upper ends of the seat tube and head tube in axial alignment. A carbon fiber tube 178 extends between lug fittings 174 and 176 and is bonded thereto. Carbon fiber tube 178 is formed of bias ply carbon fiber tube. Bias ply carbon fiber tube has the characteristic that it bends more easily than unidirectional carbon fiber tube, however, it is more resistant to torsional stress. Thus, carbon fiber tube 178 permits vertical flexing of the top tube while resisting torsional stresses on the frame. Torsional stresses are generally undesirable and may result in energy loss, while vertical flexing is desirable. The carbon fiber tube is formed of round tubular material typically employing three or four layers. The diameter of the top tube is about 1½ inches but could be about one to two inches or so. The top and seat tubes can be sized to fit into lugs 174 and 176 or they can have reduced diameter end portions that fit in the lugs as shown in FIG. 15C.

Another embodiment 160 of the frame of the present invention is shown in FIGS. 17 and 17A-17C. In this embodiment, rear triangle 162 comprises seat stays 164 and chain stays 166 connected to a rear dropout 168, all as described above with respect to the embodiment of FIG. 15. Seat tube 170 extends between an upper end that supports the seat and a lower end that is mounted to bottom bracket shell 172. Top tube 174 extends from the upper end of seat tube 170 forwardly to head tube 176. Down tube 178 extends from mounting brackets on the head tube to a mounting bracket on or adjacent the bottom bracket shell. Down tube 178 can have various configurations, as shown in the ovalized and circular sections in FIGS. 17B and 17C. These can be varied as described in previous embodiments. The seat tube, top tube, and rear triangle and head tube all are formed of synthetic material, such as carbon fiber. The carbon fiber components are bonded in lug mounting fixtures at the ends of the carbon fiber tubes. The mounting fixtures can be carbon fiber or welded metal components. In the embodiment of FIG. 17, mounting fixture 180 at the rear end of top tube 174 has an ovalized tubular portion formed of titanium or the like, such that the ovalized portion provides a portion of the vertical flex characteristics of the top tube. With the vertical flex incorporated in mounting fixture 180, less flex can be incorporated into the top tube 174, if desired. Down tube 178 can be ovalized titanium tube as shown. Carbon fiber tube also can be employed. While ovalization is feasible with carbon fiber, the desired characteristics can be achieved in a round tube by the way the carbon fiber is laid up.

Another embodiment 190 of the frame of the present invention is shown in FIG. 18. In this embodiment, a carbon fiber top tube 192 formed of bias ply carbon fiber is bonded to lug mounting fixtures 194 and 196 at opposite ends, as described above. The mounting fixtures likewise are carbon fiber and are attached to a carbon fiber head tube 198 at the front end and to a carbon fiber seat tube 200 at the rear end. If desired, the lugs can be formed integrally with the tubes to which they are mounted. A carbon fiber rear triangle 202 comprising seat stays 204 and chain stays 206 are attached to upper and lower ends of the seat tube and to a bottom bracket shell 208 at the lower end of the seat tube. The principal difference in this embodiment of the invention is that the down tube 210 is formed of carbon fiber and has tubular mounting members 212 at the ends that fit on cylindrical or tubular mounting brackets 214 and 216 attached respectively to the head tube and bottom bracket shell. The carbon fiber down tube alternatively can be mounted using pivotal mounting brackets as employed, for example, in the embodiment of FIG. 19. All of the joints of the illustrated embodiment of the present invention are bonded. It is also possible to form the frame integrally employing monocoque construction.

Figure 19:
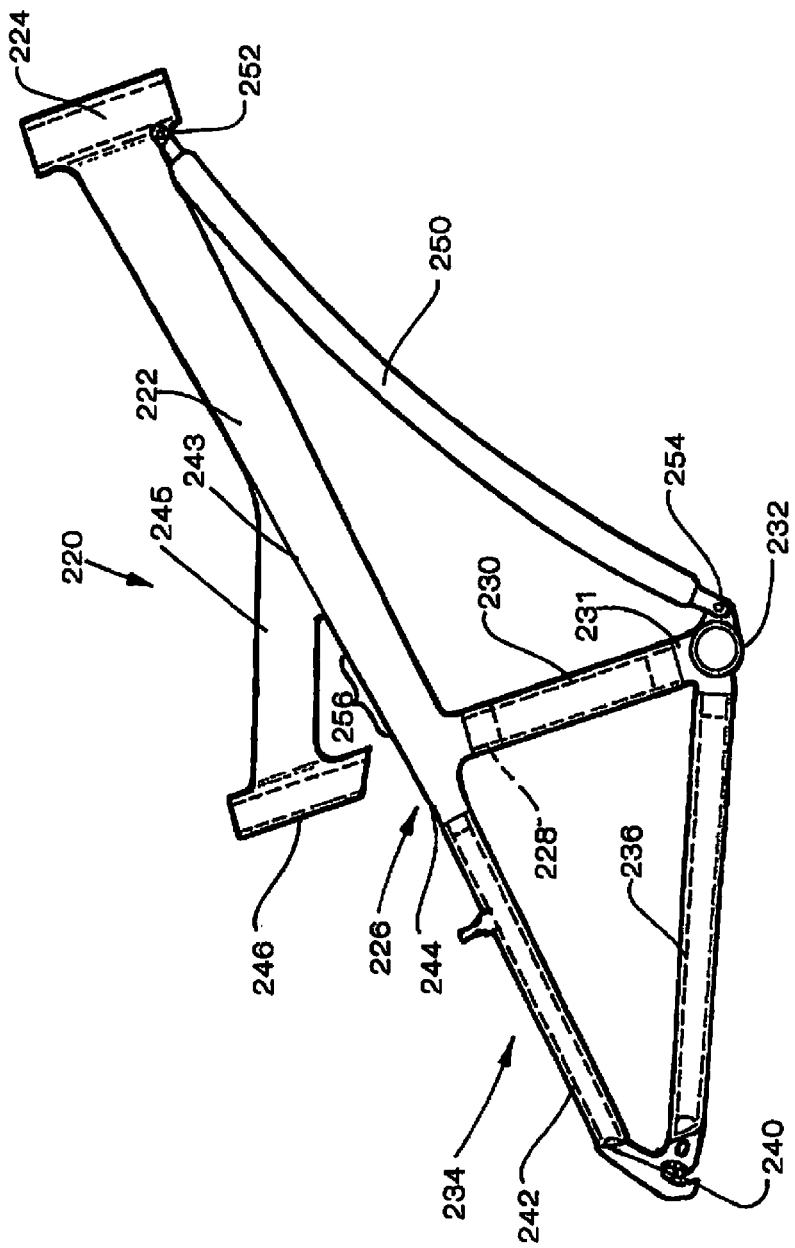
FIG. 19 is a preferred embodiment of a carbon fiber frame employing a flexible down tube in accordance with the present invention, wherein the seat tube is mounted to the top tube at a position in front of a spring flex portion of the top tube. This frame could employ a monocoque or a bonded construction.

Another embodiment 220 of the present invention is shown in FIG. 19. In this embodiment, the components are formed principally of carbon fiber materials, although other materials, including titanium, can be used. Top tube 222 extends rearwardly from head tube 224 to a rear end 226. A downwardly extending fitting 228 is bonded or integrally formed with to an upper end of downwardly extending rear support member 230. A lower end of rear support member 230 is bonded to or integrally formed with a lug fitting 231 extending from carbon fiber bottom bracket shell 232. Rear triangle 234 comprises carbon fiber chain stays 236 extending rearwardly from the bottom bracket shell 232 to aluminum dropouts 240. Seat stays 242 extend from the dropouts to a fitting 244 to which it is bonded at the rear end of top tube 222. A seat tube 246 is positioned above the rear end of top tube 222 and generally in alignment with rear support member 230. Seat bracket 245 extends forwardly from seat tube 246 to a base 248 that is bonded to or integrally formed with top tube 222 at a position forward of the rear end 226 of top tube 222. A resilient arcuate down tube 250 formed of carbon fiber or titanium extends from a pivotal mounting bracket 252 at the upper end of the down tube to a pivotal mounting bracket 254 at the lower end. The down tube is pivotally attached to these mounting brackets in substantially the same manner as described above.

While lug fittings in this and other embodiments are shown for connecting some of the various elements of the frame together, many of the components can be integrally formed together as an integral or monocoque frame employing known monocoque construction techniques.

A significant feature of this embodiment of the invention is that at least a portion 256 of the top tube between the rear end 226 of the top tube and the base 248 of seat tube bracket 245 is constructed so as to have an inherent vertical flex capability. The vertical flex is incorporated into area 256 by employing multiple layers of a carbon fiber material biased at an angle. The bias may be 45 degrees for a typical flex characteristic. However, the bias angle could be less (making the longitudinal fibers more unidirectional or parallel to the top tube), in order to stiffen the flex in flex area 256. The use of a bias ply carbon fiber material provides vertical flex to the rear of the seat support but provides increased torsion resistance. This is desirable because by having the top tube flex area at a position to the rear of the seat support post, shock loads received on the rear wheel cause upward deflection of the rear wheel, but the seat support and seat are isolated from such deflection by having the spring mounted to the rear of the seat support.

Figure 20:
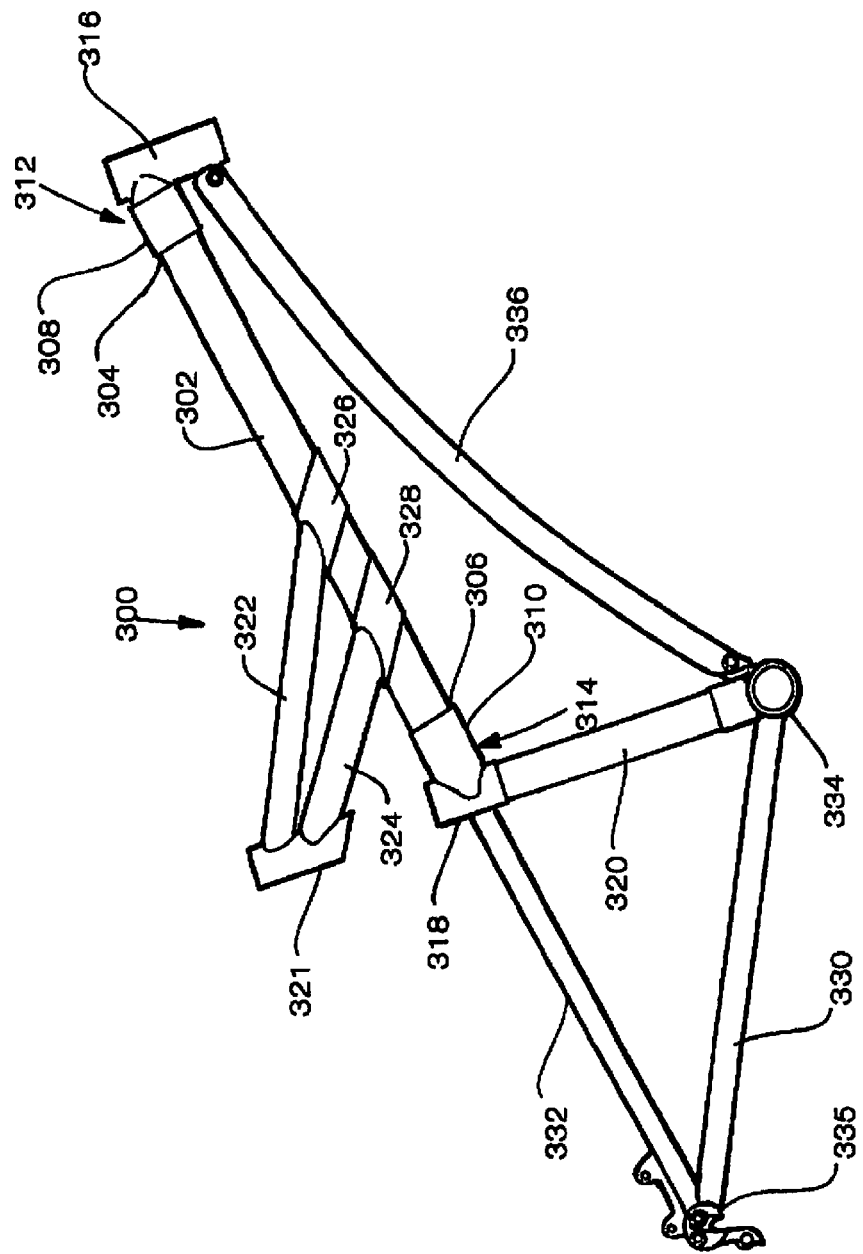
FIG. 20 is a side elevational view of another embodiment of the present invention employing a flexible carbon fiber top tube and an alternate seat support mechanism.

Another embodiment of the invention 300 is shown in FIG. 20. In this embodiment, the components are primarily formed of carbon fiber and titanium materials, although other materials can be used. Frame 300 includes a carbon fiber top tube 302 having ends 304 and 306 that fit into collars 308 and 310 on end fittings 312 and 314. The end fittings desirably are formed of titanium. The end fittings are fused to head tube 316 and the upper end section 318 of vertical support member 320. Typically, the end sections or end fittings are formed of titanium. These fittings include an inlet collar typically having a diameter of approximately one and one-half inches. The tubes extending between the end fittings are formed of carbon fiber having an outside diameter of approximately one and one-half inches, so that the carbon fiber tubes can fit snugly inside the collars on the end fittings. The carbon fiber tubes are then bonded in the titanium collars.

Seat tube 321 is desirably formed of carbon fiber. Seat tube 321 is connected with top tube 302 by means of tubular support legs 322 and 324 which extend at diverging angles from the seat tube to the top tube, where they are connected to the top tube by means of collars 326 and 328 on the ends of the support legs. Collars 326 and 328 fit over and are bonded to the carbon fiber top tube 302. The seat tube assembly desirably is formed of titanium.

The rear triangle of the frame desirably is formed of titanium or aluminum and includes a chain stay 330 and seat stay 332 connected to a rear dropout 335 at the rear end of the frame. The chain stay is connected to the bottom bracket shell 334 at the bottom of the rear support member 320.

A down tube 336 extends from head tube 316 to bottom bracket shell 334 and is pivotally connected to the head tube and the bottom bracket shell in the manner employed for prior embodiments, as shown in FIGS. 6 and 7.

In a similar embodiment 350 of the invention, shown in FIG. 21, most of the components of the embodiment of FIG. 20 are the same and are given the same numbers as in FIG. 20, with the exception that the numbers are primed.

The principal difference in the embodiment of FIG. 21 is that FIG. 21 employs a modified down tube 352. The down tube 352 can be shorter and can have a different curvature than down tube 336 of FIG. 20. The lower end 354 of the down tube can be connected in a manner of FIG. 20 or it can be connected elsewhere on the support tube 320 or the fitting at the bottom of the support tube. The upper end 356 of down tube 352 is connected to a collar 358 that fits over carbon fiber top tube 302'. Another collar 360 positioned in front of collar 358 has a leg 362 connected to it that extends downwardly and forwardly from the collar and is connected at a front end to head tube 316'. Leg 362 provides additional support for the front end of the top tube. Such support is desirable when the top end of the down tube is spaced rearwardly from the head tube. The rest of the elements of frame 350 are substantially the same as in prior embodiment.

Another embodiment 400 of the invention is shown in FIGS. 22-25. In this embodiment, instead of a resilient top tube, the bicycle frame 400 has a less or non-flexible top tube 420 formed of aluminum or the like, with flex being provided by a hinge 402 that connects the front and rear portions 404 and 406 of the frame. The hinge is pivotal about an axis perpendicular to the plane of the frame. The hinge has a front portion 408 that connects to the top tube 420 at the rear end of the top tube behind the point where the seat tube base or support legs 422 and 424 attach to the top tube. The rear 412 of the hinge is attached or integral to the essentially rigid rear triangle 430. A pivot pin connects the back portion of the hinge on the rear triangle to the front portion of the hinge 408 that is connected to the top tube and allows the frame to articulate along a vertical plane when bumps and rough surfaces are encountered, thereby providing a smoother ride.

The construction of frame 400, with the exception of the hinge mechanism and substantially rigid top tube is substantially similar to the construction of the frame of frames 300 and 350, shown in FIGS. 20 and 21. Frame 400 includes top tube 420 connected to head tube 416 at a front end and connected to the hinge assembly 402 at a rear end. Seat tube 421 is connected to collars 426 and 428 on top tube 402 by means of support arms 422 and 424. A rear triangle 430 includes seat stays 432, chain stays 434 and a rear support member 436 connected in a triangle, with a bottom bracket shell 438 being attached at the lower front end and a rear dropout 440 at a lower rear corner. A down tube 442 (also called an arc tensioner) extends between pivotal attachments 444 at the bottom bracket shell and 446 at the lower end of the head tube. An alternative down tube 442' is shown in phantom FIG. 22. Down tube 442' is shorter than down tube 442 and extends from pivotal mounting bracket 446 to pivotal mounting bracket 448. A choice of longer or shorter or more or less flexible down tubes can be based on the weight of the rider or the riding conditions or other factors.

The details of the hinge assembly 402 are shown in FIGS. 23-25. Hinge assembly 402 includes a flange 460 at front portion 408 that extends forwardly from the front end of seat stay 432 on the aluminum rear triangle. Flange 460 has a bushing opening 462 extending horizontally therethrough in a transverse direction with respect to the plane of the bicycle. A bushing 464 fits in the opening 462. A pair of spaced flanges 466 are positioned on opposite ends of flange 460 with openings 468 therethrough that align with opening 462 in flange 460. Flange 460 fits in opening 470 between flanges 466. Bushings 472 fit in openings 468 and flanges 466. This assembled construction is shown in FIG. 25.

Pivot pin 474 fits through openings in bushings 472 and 464. A female locking bolt 476 fits in central opening 478 in the pivot pin. A male locking bolt 480 fits in the opposite side of the flange openings and threads into openings 482 in the female locking bolt 476. The male and female locking bolts are engaged by recessed hex fastener openings in the ends of the male and female members. The assembled construction of the hinge assembly is shown in FIG. 23. The hinge assembly provides vertical pivotal movement of the rear triangle with respect to the portion of the frame while maintaining lateral stability.

Figure 26:
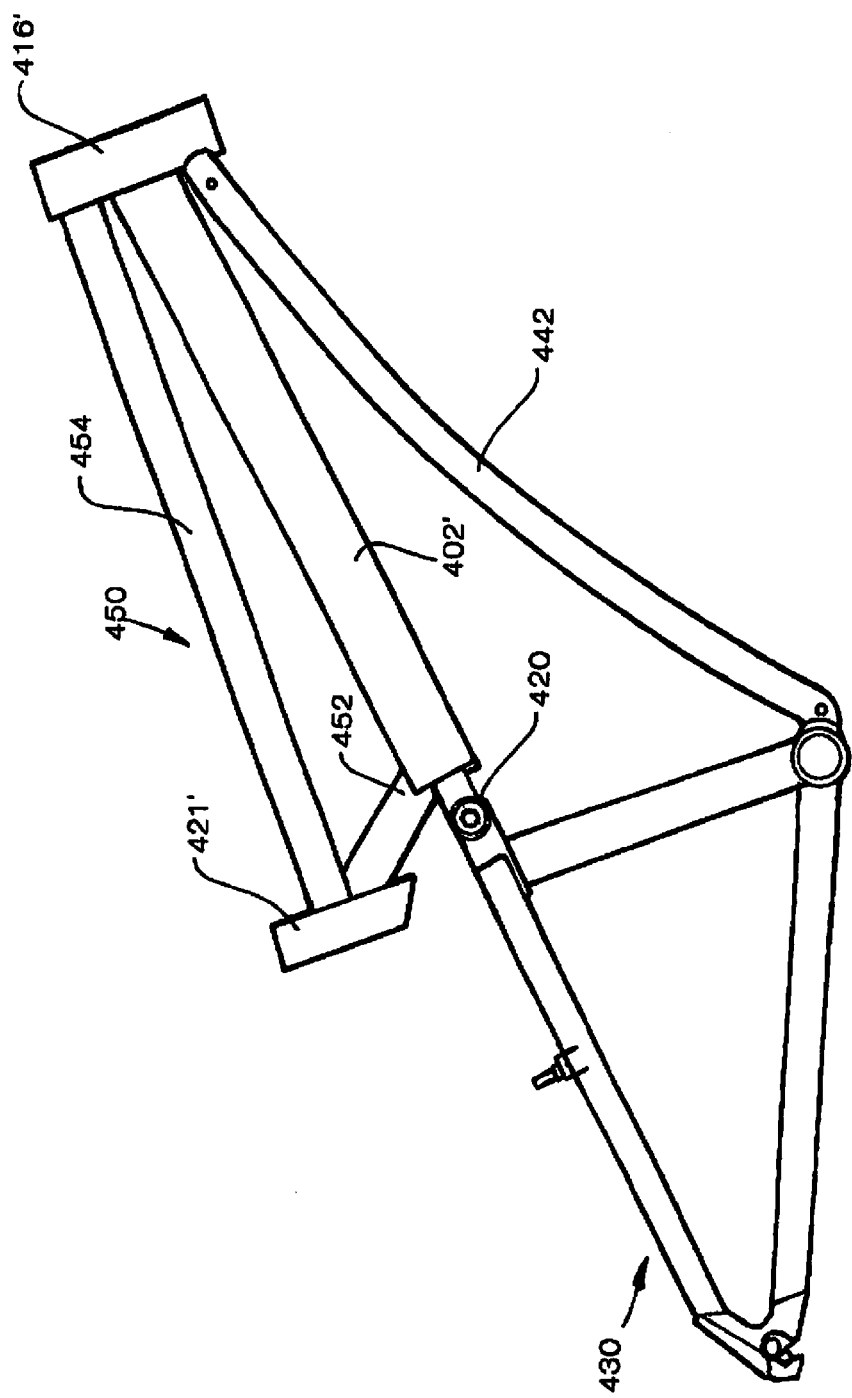
FIG. 26 is a side elevational view of another embodiment of the hinged frame assembly of FIG. 22, showing a secondary elongated top tube.

An alternative embodiment 450 of a hinge assembly frame is shown in FIG. 26. Elements that are common with the embodiment of FIG. 22 employ the same numerals, with the numerals being primed. The embodiment 450 of FIG. 26 employs the same down tube 402', hinge assembly 420', rear triangle 430' and down tube or arc tensioner 442'. The principal difference in the embodiment of FIG. 450 is that seat tube 421' is attached to the down tube 402' by support member 452, and a separate support member 454, which serves as an upper top tube member and extends from seat tube 421' to head tube 416' and does not extend downwardly and connect with the head tube, as in the embodiment of FIG. 23. For certain applications, an upper top tube 454 is preferable to the downwardly extending support leg 422 of the FIG. 22.

The amount and rate of motion at the hinge is limited by an arcuate spring down-tube that is connected at the front of the bottom bracket on the rear triangle and at the bottom of the head tube at the front of the top tube. Both ends of the down-tube are connected with pins that allow for rotation between the front and rear frame members and the down-tube connections.

The points where the down-tube connects to the rear triangle and the top-tube may be positioned in somewhat different locations. Points behind the head tube along the (underside of the) top tube may also be desirable locations to attach the down-tube. The point on the front tube of the rear triangle may also be located at higher points closer to the hinge. A combination of these options could utilize a shorter and possibly lighter weight down-tube to be used. Due to the changes in leverage this could also provide more wheelbase extension or contraction with the same, or less, down-tube movement (flex) which could provide a smoother ride and a lighter bicycle. Although these points would not be as strong as the preferred previously mentioned locations they may be adequate and even more desirable for some uses.

The articulation between the front and rear frame members allows the wheelbase to lengthen and shorten in amounts up to an inch in or more in each direction, extension and contraction. A range of extension of up to 1½ inches is desirable, especially for a mountain bike.

Unlike the top-tube in the carbon fiber embodiment, the top tube is essentially rigid and not designed to bend or flex. The material for the top tube can vary but aluminum is the most economical material that substantially resists torsional flex making it the most desirable.

Controlling the amount of movement is the strength of the particular arcuate spring down-tube. The down tube can be a removable and replaceable member of different strengths designed to accommodate different riders of different strengths or weights or for different riding situations for a particular rider. As in the carbon fiber embodiment the down tube can be exchanged using removable pins at each end, or it can be an essentially non removable member with non removable pins. In either case the down tube is held in place with pins that allow the mounting points at each end to rotate at the connection points. This allows the hinge and the down tube to be the main factors controlling the desired amount of frame flex. The down-tube is ideally made of titanium but due to cost steel will likely be the material of choice.

The hinge is a torsionally rigid member that keeps the frame from flexing laterally under arduous pedaling pressures and in rigorous cornering loads. Ideally (preferably) the hinge is made of aluminum for strength and light weight and cost.

The hinge point can also be a place where the rear triangle can be disconnected with a removable axis pin or locking bolt thereby making the removal and replacement of the different strength arcuate down-tubes easier. This element also allows for more compact shipping or storing, an important and valuable feature.

All of the foregoing embodiments of the invention provide a number of advantages over prior frame construction. In all cases, the frame has the appearance of a conventional frame but provides a desirable vertical flex property in combination with increased lateral and torsional resistance. The vertical flex, particularly when a highly resilient material such as carbon fiber or titanium is used, maximizes energy conservation and even appears to increase energy efficiency of a frame in comparison with a completely rigid frame.

The specific construction of the frame elements can be varied, depending on the frame design, the weight of the rider, the riding conditions, the type of bike, and the materials employed. Desirably, the frame is constructed so that the frame flexes resiliently downwardly during the power portion of a pedaling cycle (approximately when the forward pedal is between a two o'clock and a five o'clock position or so) and then returns resiliently to its undeflected state during the time in the pedaling cycle when the pedaling pressure is reduced (approximately between five and eight o'clock or eleven and two o'clock). The frame springs back to its undeflected position during the lower off pressure portions of the pedaling cycle, providing a smoother ride and applying the pressure stored in the frame to drive the bike during the off portion of the cycle. The ability to pedal the bike smoothly at a faster pedaling rate with the same effort is one of the benefits that may be achieved with this frame.

To achieve the proper resilience, a bicycle may be constructed so that the vertical flex of the frame is at least about twice the flex of a conventional rigid aluminum or steel frame, and preferably about three or more times as much flex as a rigid frame. This flex is still substantially less than the cushioning provided by a coil spring or shock absorber suspension.

As an example, in one deflection test conducted on a spring frame of the present invention in comparison with rigid and coil spring frames, the results indicated comparative deflective values under 320 pound loads of 0.011 inches for a rigid frame, 0.090 inches for a coil spring frame, and about 0.033 inches for the frame of the present invention.

Different flex characteristics can be designed into a frame for different riding conditions. When a replaceable down tube is used, the flex characteristics and other riding characteristics can be adjusted at any time in order to optimize the ride and energy utilization characteristics for any rider or riding conditions. While carbon fiber frames have some design advantages in terms of design flexibility and variations, the present invention can advantageously be used with a wide variety of frame type and construction techniques.

The frame of the present invention provides comfortable, resilient suspension for the bike frame, without employing separate suspension components, such as springs or shock absorbers and without employing a frame construction that is visually significantly dissimilar from a conventional unsuspended bike frame.

It should be understood that the foregoing is merely exemplary of the preferred practice of the present invention and that various changes in the arrangements and details of constructions of the embodiments disclosed herein may be made without departing from the spirit and scope of the present invention.

What is claimed is:

1. In a bicycle frame of a bicycle having frame components that include a top tube extending contiguously from a seat tube at a rear of the frame to a head tube at a front of the frame, a down tube extending downwardly from a front end thereof to a rear end thereof, the front end of the down tube being pivotally joined to the head tube, the rear end of the down tube being pivotally joined to a bottom bracket shell that is also attached to a lower end of the seat tube, the bottom bracket shell having a transverse opening therethrough in which a pedal assembly is mountable, the improvement wherein:

the top tube is formed of a resilient tubular material and has front and rear ends, the front end of the top tube being attached rigidly to the head tube, the rear end of the top tube being attached rigidly to the seat tube, the top tube having a spring rate such that the front end of the top tube is capable of flexing vertically within a range of about 1/16 inch and 1½ inches with respect to the rear end of the top tube while the bicycle is being ridden by a rider; and the down tube is formed in a vertically disposed arcuate shape so as to be curved downwardly when viewed from a side view of the bicycle, the down tube being elastically deflectable in both compression and extension directions relative to the direction between the front and rear ends of the down tube, the down tube having a spring rate such that the front end of the down tube is capable of flexing vertically within a range of about 1/16 inch and 1½ inches with respect to the rear end of the down tube while the bicycle is being ridden by the rider, the down tube being attached at its respective front and rear ends to the bottom bracket shell and the head tube by transverse pivot connectors that permit vertical pivotal movement of the front and rear ends of the down tube with respect to the head tube and bottom bracket shell as the down tube flexes upwardly and downwardly.

2. A bicycle frame as in claim 1 wherein the front ends of the top tube and down tube are capable of flexing vertically within a range of 1/16 inch to 3/8 inch inches with respect to the rear ends of the top tube and down tube, respectively, while the bicycle is being ridden by the rider.

3. A bicycle frame as in claim 1 wherein the top tube and down tube are capable of flexing vertically within a range of ¼ inch to ⅜ inches with respect to the rear ends of the top tube and down tube, respectively, while the bicycle is being ridden by the rider.

4. A bicycle frame as in claim 1 wherein the pivot connectors are manually releasable such that the down tube can be removed from the frame and be replaced with another down tube having a different length, spring rate or tubular shape.

5. A bicycle frame according to claim 1 wherein the top tube and down tube are each formed of multiple layers of bias ply carbon fiber material.

6. A bicycle frame as in claim 1 wherein the down tube is formed of one or more of carbon fiber reinforced resin and titanium.

7. A bicycle frame as in claim 1 wherein a front pivot connector of the pivot connectors includes a base attached to the head tube at a point of attachment of the down tube with the head tube and a rear pivot connector of the pivot connectors includes a base attached to the bottom bracket shell at a point of attachment of the down tube with the bottom bracket shell, each base attached to a transversely extending tubular member that fits inside of an open space of the down tube at the respective front and rear ends of the down tube, the tubular member having openings with bushings inserted therein, the down tube including opposing openings that align with the bushings in the openings of the tubular member, and fasteners extending through the opposing down tube openings and through the bushings pivotally attach the down tube to each respective base on the head tube and bottom bracket shell.

8. A bicycle frame as in claim 7 wherein inwardly facing opposing sockets are mounted in the opposing openings of the down tube, each of the opposing sockets having openings at inner ends thereof that align with the bushings in the openings of the tubular member, each of the fasteners having a head at one end thereof and threads at an opposite end thereof, the fasteners extend through the opposing sockets in the opposing down tube openings, though the socket openings and through the bushings in the openings of the tubular member to pivotally attach the down tube to each respective base on the head tube and bottom bracket shell, and wherein the head of the fastener is positioned into one of the opposing sockets and a nut is positioned into the other of the opposing sockets and threaded on the threads of the fastener in such a manner that the fastener is rotatable with respect to the opposing sockets and rotation of the opposing sockets during vertical pivotal movement of the down tube does not unthread the fastener from the nut.

9. A bicycle frame as in claim 1 wherein the down tube comprises a metal tube comprising titanium and at least a portion of the down tube is an ovalized portion having an oval tubular shape.

10. A bicycle frame as in claim 1 wherein the top tube comprises a metal tube comprising titanium.

11. A bicycle frame as in claim 10 wherein the top tube is at least 1 inch in diameter.

12. A bicycle frame as in claim 10 wherein the top tube is about 1½ inches in diameter and comprises an ovalized portion having an oval tubular shape having a minor diameter of about 1 inch.

13. A bicycle frame as in claim 10 wherein the top tube comprises an ovalized portion having a length of about 1-3 inches.

14. A bicycle frame as in claim 1 wherein the pivot connectors are releasable such that the down tube can be removed from the frame and be replaced with another down tube.

15. A bicycle frame as in claim 1 wherein the pivot connectors are releasable such that the down tube can be removed from the frame and be replaced with one of a plurality of down tubes having different spring rates.

16. A bicycle frame as in claim 1 wherein the pivot connectors are releasable such that the down tube can be removed from the frame and be replaced with one of a plurality of down tubes having different lengths.

17. A bicycle frame for a bicycle, the bicycle frame comprising:
a longitudinally disposed top tube having front and rear ends, the top tube being formed of a resilient material and being resiliently deflectable in a vertical direction;
a head tube rigidly mounted to the front end of the top tube and extending downwardly, the head tube having an open interior in which a front fork and handle bar assembly are rotatably mounted;
a seat tube having upper and lower ends, the seat tube being rigidly mounted to the rear end of the top tube adjacent to the upper end of the seat tube, the top tube extending contiguously from the seat tube to the head tube, the upper end of the seat tube having an opening in which a seat is mounted by means of a seat support stem;
a bottom bracket shell mounted to the lower end of the seat tube, the bottom bracket shell having a transverse opening therethrough in which a pedal assembly is mounted; and
a resilient down tube having front and rear ends, the down tube formed in an arcuate shape so as to be curved downwardly when viewed from a side view of the bicycle, the front end of the down tube being releasably mounted to the head tube for vertical pivotal movement with respect to the head tube, the rear end of the down tube being releasably mounted to the bottom bracket shell for vertical pivotal movement with respect to the bottom bracket shell, the down tube being attached to the head tube and bottom bracket shell by transverse releasable fasteners that interconnect the front end of the down tube with the head tube and interconnect the rear end of the down tube with the bottom bracket shell, and the fasteners being manually releasable in order to permit the down tube to be removed and be replaced with one of a plurality of different replacement down tubes releasably mountable to the head tube and bottom bracket by the manually releasable fasteners.

18. A bicycle frame according to claim 17 wherein the plurality of different replacement down tubes each have different spring rates.

19. A bicycle frame according to claim 17 wherein the down tube is formed of a material comprising titanium alloy.

20. A bicycle frame according to claim 19 wherein a portion of the down tube adjacent to the front end thereof is ovalized such that the ovalization of the portion of the down tube increases vertical flexibility of the down tube and decreases lateral flexibility of the down tube.

21. A bicycle frame according to claim 17 wherein the plurality of different replacement down tubes each have ovalized portions having one or more of different shapes or lengths.

22. A bicycle frame according to claim 17 wherein the top tube is formed of a material comprising carbon fiber.

23. A bicycle frame according to claim 22 wherein the top tube is securely and non-pivotally attached at its front and rear ends respectively to the head tube and seat tube.

24. A bicycle frame according to claim 22 wherein the top tube is attached to the head tube and seat tube by one of lugged, bonded, welded or monocoque attachment.

\* \* \* \* \*